US012269396B2

(12) United States Patent
Skinner

(10) Patent No.: US 12,269,396 B2
(45) Date of Patent: Apr. 8, 2025

(54) CAMERA MOUNTING DEVICE FOR A VEHICLE

(71) Applicant: TUSIMPLE, INC., San Diego, CA (US)

(72) Inventor: Todd Skinner, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 181 days.

(21) Appl. No.: 18/045,325

(22) Filed: Oct. 10, 2022

(65) Prior Publication Data

US 2023/0115905 A1 Apr. 13, 2023

Related U.S. Application Data

(63) Continuation of application No. 16/828,421, filed on Mar. 24, 2020, now Pat. No. 11,465,568.

(60) Provisional application No. 62/824,250, filed on Mar. 26, 2019.

(51) Int. Cl.
*B60R 11/04* (2006.01)
*B60R 11/00* (2006.01)
*G03B 17/56* (2021.01)

(52) U.S. Cl.
CPC ............ *B60R 11/04* (2013.01); *G03B 17/561* (2013.01); *B60R 2011/004* (2013.01)

(58) Field of Classification Search
CPC .. B60R 11/04; B60R 2011/004; G03B 17/561
See application file for complete search history.

(56) References Cited

U.S. PATENT DOCUMENTS

| 4,029,246 A | 6/1977 | Woodruff |
| 4,830,557 A * | 5/1989 | Harris ................... F16B 37/044 411/113 |
| 6,315,180 B1 | 11/2001 | Watkins |

(Continued)

FOREIGN PATENT DOCUMENTS

| CA | 2052344 A1 | 3/1993 |
| CN | 204978463 U | 1/2016 |

(Continued)

OTHER PUBLICATIONS

Chinese Patent Office, 2nd Office Action & Search Report for CN Application No. 202010225458.2 mailed Sep. 15, 2023, 6 pages with English translation.

(Continued)

*Primary Examiner* — Noam Reisner
(74) *Attorney, Agent, or Firm* — Perkins Coie LLP

(57) ABSTRACT

Disclosed is a camera mounting apparatus for a vehicle that attaches the camera to the vehicle, isolates the camera from vibration at the mounting points, and accommodates thermal expansion and contraction of the vehicle and the mounting structure. The apparatus includes a camera mounting beam coupled to the camera, and one or more elastomeric vibration isolators coupled to an attachment device and coupled to the camera mounting beam. The apparatus also includes a spherical bearing coupled to the attachment device, wherein the spherical bearing is configured to accommodate misalignment of the attachment device, and one or more spring washers to generate a force holding the one or more elastomeric vibration isolators and spherical bearing in positions.

18 Claims, 26 Drawing Sheets

(56) References Cited

U.S. PATENT DOCUMENTS

| | | |
|---|---|---|
| 8,811,812 B1 | 8/2014 | Lawler et al. |
| 2005/0265711 A1 | 12/2005 | Heibel |
| 2006/0066835 A1 | 3/2006 | Laufer et al. |
| 2006/0072008 A1 | 4/2006 | Miyazaki et al. |
| 2006/0239678 A1 | 10/2006 | Itzkowitz |
| 2010/0128245 A1 | 5/2010 | Inagaki et al. |
| 2012/0081550 A1* | 4/2012 | Sewell ............... H04N 23/50 348/148 |
| 2012/0327230 A1 | 12/2012 | Ellison |
| 2014/0016922 A1 | 1/2014 | Greenthal |
| 2014/0369746 A1* | 12/2014 | Heston ............... F16D 1/076 403/374.4 |
| 2015/0131982 A1* | 5/2015 | Starns ............... F16F 3/0876 267/141.1 |
| 2015/0358523 A1 | 12/2015 | Mohr |
| 2016/0195799 A1 | 7/2016 | Koyama |
| 2016/0355142 A1 | 12/2016 | Hinge et al. |
| 2017/0026585 A1 | 1/2017 | Shaw et al. |
| 2017/0232909 A1 | 8/2017 | Kuehnle |
| 2017/0261064 A1 | 9/2017 | Liu et al. |
| 2018/0037172 A1 | 2/2018 | Nelson et al. |
| 2020/0401020 A1 | 12/2020 | Masuda et al. |

FOREIGN PATENT DOCUMENTS

| | | |
|---|---|---|
| CN | 106891824 A1 | 6/2017 |
| CN | 108087648 A1 | 5/2018 |
| DE | 2448703 A1 | 4/1976 |
| JP | H11301365 A | 11/1999 |
| WO | 2001070539 A1 | 9/2001 |
| WO | 2014071390 A1 | 5/2014 |
| WO | 2015022433 A1 | 2/2015 |

OTHER PUBLICATIONS

Calamar, George. European Application No. 20165241.9-1132 Extended European Search Report Mailed Jun. 18, 2020, pp. 1-8.

Chinese Patent Office, Office Action for CN Application No. 202010225458.2 mailed Apr. 17, 2023, 8 pages.

Chinese Patent Office, Search Report for CN Application No. 202010225458.2 mailed Apr. 14, 2023, 4 pages.

Search Report from European Patent Application No. 23191712, dated Oct. 31, 2023, (9 pages).

Australian Patent Office, Examination Report No. 1 for AU Appl. No. 2020202053, mailed on Dec. 13, 2024, 5 pages.

* cited by examiner

| Item No. | Qty. | Description |
|---|---|---|
| 215 | 12 | SCREW |
| 214 | 12 | LOCK WASHER |
| 213 | 12 | FLAT WASHER |
| 212 | 3 | BEAM CAP |
| 211 | 1 | BEAM |
| 210 | 3 | WASHER |
| 209 | 1 | BOLT |
| 208 | 8 | SPACER |
| 207 | 1 | SPACER |
| 206 | 6 | ELASTOMERIC ISOLATOR |
| 205 | 2 | BOLT |
| 204 | 14 | BELLEVILLE WASHER |
| 203 | 2 | SPHERICAL WASHER |
| 202 | 2 | SPHERICAL BEARING |
| 201 | 2 | OFFSET SPACER |

*FIG. 4*

CAMERA MOUNTING DEVICE FOR A VEHICLE

CROSS-REFERENCE TO RELATED APPLICATION

This patent document is a continuation of U.S. patent application Ser. No. 16/828,421, entitled "CAMERA MOUNTING DEVICE FOR A VEHICLE," filed Mar. 24, 2020, which claims priority to, and benefit of, U.S. Provisional Patent Application No. 62/824,250 entitled "CAMERA MOUNTING DEVICE FOR A VEHICLE," filed on Mar. 26, 2019. The entire contents of the aforementioned patent applications are incorporated by reference as part of the disclosure of this patent document.

TECHNICAL FIELD

This document relates to camera housings for a vehicle such as an autonomous truck.

BACKGROUND

Vehicles may include attached cameras. For example, cameras may be attached for security purposes, as a driving aid, or to facilitate autonomous driving. Vehicles vibrate due to engine vibration, the road, air turbulence, and wind buffeting. These vehicle vibrations can be introduced into camera images which cause a decrease in the quality of the image. Moreover, thermal affects can cause a camera mounting system to change where the camera is pointed over temperature. Current techniques are expensive and ineffective. New techniques are needed to reduce the cost and improve the stability of vehicle camera mounting structures.

SUMMARY

Disclosed are devices, systems and methods for mounting one or more cameras to a vehicle that preserves the pointing angles of the camera and reduces vehicle induced vibration of the cameras. In one aspect, a method is disclosed. The method includes isolating, by a first mount including an elastomeric device, vibration at the vehicle from a structure for mounting the camera, wherein the elastomeric device is configured to attenuate vibration according to a vibration profile, and wherein the first mount is configured to prevent a lateral sliding of the structure through the first mount, wherein the first mount attaches the structure to the vehicle. The method further includes sliding laterally, by one or more second mounts attaching the camera to the vehicle, the one or more second mounts including other elastomeric devices, in response to a temperature change the structure through an opening in the structure.

The following features can be included in various combinations. The one or more second mounts each includes an attachment device that slides in an obround opening in the structure. The first mount passes through a round opening and does not slide in in the structure. The one or more second mounts slide laterally in the structure to in response to a temperature difference between the vehicle and the structure. The one or more second mounts slide laterally in in the structure in response to a difference in a coefficient of expansion between the vehicle and the structure. The elastomeric devices are structured to absorb vertical vibration from the vehicle. The vehicle is a truck or other road vehicle.

In another aspect, an apparatus is disclosed. The apparatus includes an elongated element having a first surface and a second surface. The apparatus further includes a first mount coupled via a first coupling to the elongated element at the second surface at a first position along the elongated element, wherein the first coupling comprises an elastomeric material, and wherein the first coupling couples the elongated element fixing a lateral position of the elongated element. The apparatus includes one or more second mounts coupled via one or more second couplings to the elongated element at the second surface at one or more second positions along the elongated element, wherein the one or more second couplings comprise the elastomeric material, and wherein the one or more second couplings couple the elongated element accommodating lateral expansion or contraction of the elongated element.

The following features may be included in various combinations. The first surface is coupled to a vehicle. The one or more second mounts each include an attachment device that slides in a slot in the elongated element. The one or more second mounts are structured for the elongated element to slide laterally in response to a temperature difference between the vehicle and the structure. The one or more second mounts are structured for the elongated element to slide laterally in response to a difference in a coefficient of expansion between the vehicle and the structure. The elastomeric device absorbs vertical and lateral vibration from the vehicle.

In another aspect, another apparatus id disclosed. The apparatus includes a camera mounting beam coupled to the camera, and one or more elastomeric vibration isolators coupled to an attachment device and coupled to the camera mounting beam. The apparatus further includes a spherical bearing coupled to the attachment device, wherein the spherical bearing is configured to accommodate misalignment of the attachment device, and one or more spring washers to generate a force holding the one or more elastomeric vibration isolators and spherical bearing in positions.

The following features can be included in various combinations. The apparatus further includes a spherical washer to adjust a planar surface of the spherical bearing along the attachment device. The attachment device is a bolt and the one or more spring washers are Belleville washers. The one or more elastomeric vibration isolators are formed from one or more materials including polyurethane, rubber, closed cell foam. The one or more materials are selected to attenuate the vibration profile of a particular vehicle. The particular vehicle is a tractor portion of a tractor trailer. The camera mounting beam includes an obround opening within which the one or more elastomeric vibration isolators, the spherical bearing, and the one or more spring washers slide in response to thermal expansion or contraction of the camera mounting beam relative to a vehicle to which the apparatus is attached via at least the attachment device.

The above and other aspects and features of the disclosed technology are described in greater detail in the drawings, the description and the claims.

BRIEF DESCRIPTION OF THE DRAWINGS

FIG. 4 depicts a table of hardware for an example camera mounting structure, in accordance with some example embodiments;

DETAILED DESCRIPTION

Figure 1A:
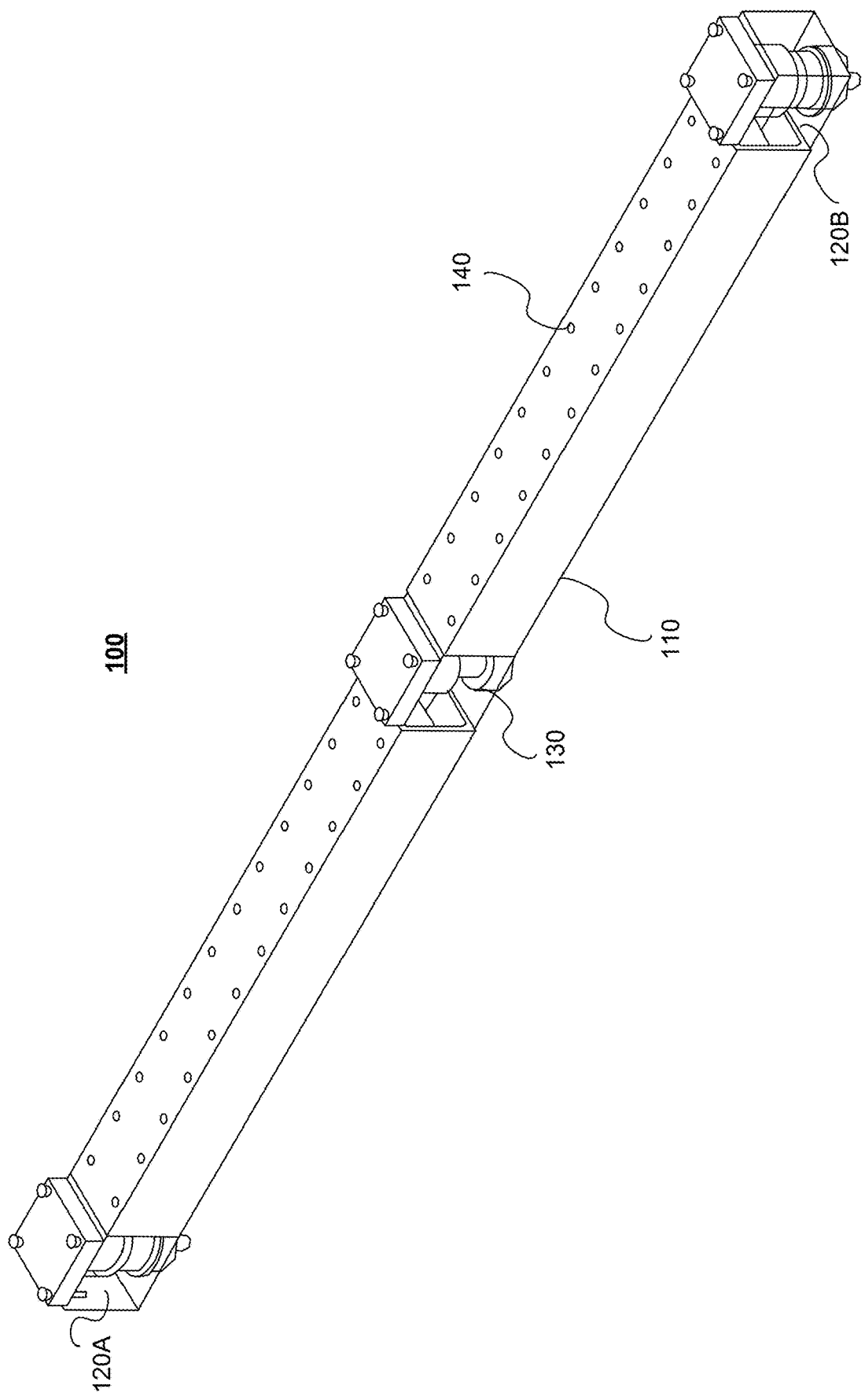
FIG. 1A depicts an example of a camera mounting structure for a vehicle with three attachment points, in accordance with some example embodiments.

Disclosed is a camera mounting structure for a vehicle that attaches the camera to the vehicle at mounting points, isolates the cameras from vehicle vibration, and accommodates thermal expansion and contraction of the mounting structure relative to the vehicle. The position of each camera and the angle each camera is pointing (e.g., azimuth angle and elevation angle) affects the images collected by the cameras and any changes affect the images captured by the camera. These changes should be accounted for, or corrected for, under all operating conditions including various temperatures and shock and vibration conditions. For example, in autonomous driving applications, the pictures collected by the cameras mounted to the vehicle are used by various driving and safety algorithms and so changes in the images can impact vehicle safety. The vehicle may vibrate in one or more dimensions such as laterally from side-to-side, laterally front-to-back, and vertically up-and-down. Some vehicles may exhibit more vertical vibration than in the lateral side-to-side and front-to-back directions.

In some example embodiments, a camera mounting structure is attached to an autonomous vehicle such as an autonomous truck, car, or other vehicle. For example, the camera mounting structure may be attached to the vehicle at three (or another number of) points. For example, three equally spaced attachment points may be used with one in the center, one on the right side and one on the left side of the vehicle. In this example embodiment, the center mount may be different from the right and left side mounts.

The center and end mounts may attach to the vehicle via an attachment that includes one or more elastomeric isolators to attenuate or prevent vehicle vibration from being transferred from the vehicle to the camera mounting structure. For example, the vehicle may produce primarily vertical vibration due to the engine and road surface, although lateral (forward-backward and right-left) vibrations may be present as well, that are each attenuated or removed by the elastomeric isolators. Thus, vibrations in three dimensions may be attenuated by the elastomeric isolators. Vibrational energy that would be transmitted through the attachment points is absorbed by the elastomeric isolators so that the vibrations at the vehicle are attenuated at the camera mounting structure and accordingly at cameras mounted to the camera mounting structure. For example, the one or more elastomeric isolators may attenuate vibrations including vertical vibrations 10 dB or more.

At each end of the camera mounting structure, end mounts may be included with the same elastomeric isolators at the center mount. In some example embodiments, the end mounts may allow the ends to move laterally to accommodate changes in length of the structure. Lengthening or shortening may be caused by differences between the temperature of the camera mounting structure and the vehicle and/or differences in a coefficient of thermal expansion between the camera mounting structure and the vehicle. The camera mounting structure may lengthen relative to the vehicle when the camera mounting structure is hotter than the vehicle and/or the coefficient of thermal expansion of the camera mounting structure is larger than the vehicle. The camera mounting structure may shorten relative to the vehicle when the camera mounting structure is colder than the vehicle and/or the coefficient of thermal expansion of the camera mounting structure is smaller than the vehicle. A vehicle may experience an outside air temperature range of −40 deg. F. to +135 deg. F.

In some environmental situations such as one side of the autonomous vehicle being significantly hotter or colder that the other side (e.g. due to sun on one side and not the other), one side of the camera mounting structure may slide out and the other side slide in toward the center mount. For example, one end mount of a three-mount structure may slide out away from the center of the truck due to increased temperature in the section of the camera mounting structure between the one end mount and the center mount, and the other end mount of a three-mount structure may slide in toward the center of the truck due to decreased temperature in the section of the camera mounting structure between the other end mount and the center mount. The sliding is further detailed below.

In some example embodiments, elastomeric isolators at the various mounts such as end mounts, center mount, or mounts in between, may have different durometers and/or vibration attenuation properties to attenuate the vibrations at each mount location. For example, one of the mounts may experience added vibration compared to the other mounts at a particular frequency due to engine vibration. The mount with added engine vibration may include elastomeric isolators with durometer selected to attenuate the particular engine vibration frequency.

Lateral movement due to lengthening or shortening of the camera mounting structure may be accommodated via slots in the camera mounting structure. The slots may be obround in shape. When the camera mounting structure lengthens relative to the attached vehicle, the camera mounting structure may slide outward in the slots from the center. Similarly, contraction of the camera mounting structure relative to the vehicle may be accommodated by the end mounts sliding toward the center of the camera mounting structure or center mount where the sliding is accommodated by the slots. The center mount may not have a slot. In this way, the center mount holds the camera mounting structure in place from sliding from side to side while the end mounts accommodate the expansion and contraction of the camera mounting structure.

FIG. 1A depicts an isometric view 100 of a camera mounting structure 110 to attach a camera to a vehicle, in accordance with some example embodiments. Camera mounting structure 110 includes center mount 130 and end mounts 120A and 120B. The center mount 130 may be attached to the vehicle without allowing the structure to slide at the center mount. The camera mounting structure 110 may slide in the end mounts 120A and 120B to accommodate lengthening and contraction of the camera mounting structure due to differences in temperature and/or coefficient of thermal expansion of the camera mounting structure compared to the vehicle. By accommodating the temperature induced changes in length, the camera mounting structure will not buckle or change shape thereby preserving the camera position and pointing angle. In some example embodiments, the angle alignment between the cameras is maintained to within less than 0.1 degree. One or more cameras may be mounted in various mounting positions on the camera mounting structure 110 using by bolting the camera to different holes in an array of holes 140 in the camera mounting structure 110. In some example embodiments, the cameras are mounted in locations that do not change and accordingly fewer or no holes may be present. Note that the views of the structure at the center mount and the end mounts are translucent in FIGS. 1A and 2 to show the internal detail. The beam at 110 may be a single element that extends from one end of the camera mounting structure to the other.

Figure 1B:
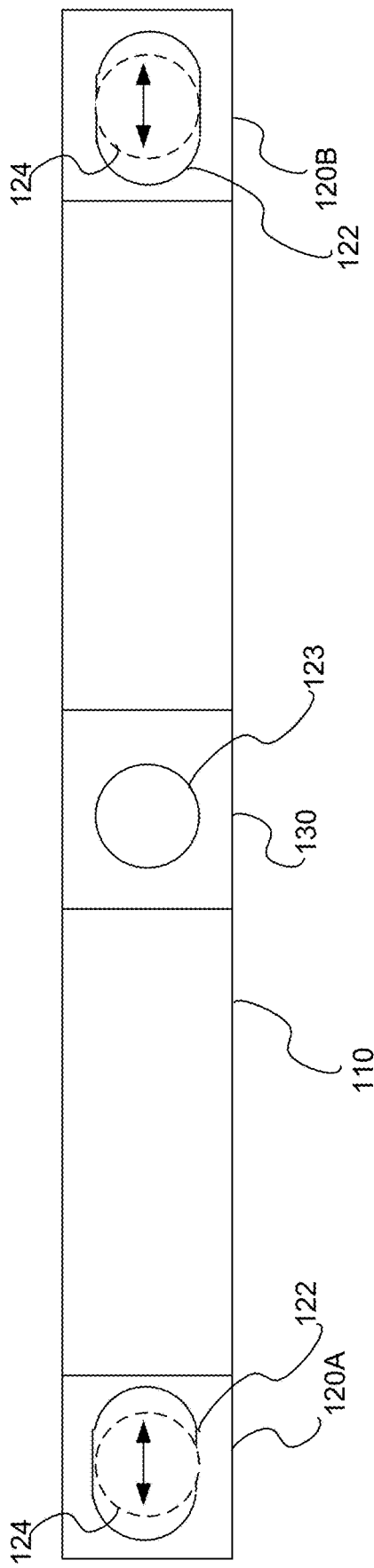
FIG. 1B depicts a bottom view of the camera mounting structure for a vehicle with three attachment points, in accordance with some example embodiments.

FIG. 1B depicts a bottom view of the camera mounting structure 110 with three attachment points, in accordance with some example embodiments. Shown in FIG. 1B are end mounts 120A and 120B with obround openings 122 through the end mounts to accommodate the lengthening and contraction of the camera mounting structure 110 due to temperature and coefficient of thermal expansion differences. Shown at 124 is an outline of the vibration isolation stack-up on bolt 205 in FIG. 2 which can slide in the obround openings 122 (indicated by arrows). Throughout this document, the obround openings 122 may be referred to as "slots." The center mount has a round opening 123. The round opening 123 holds the camera mounting structure 110 from sliding along its length.

Figure 2:
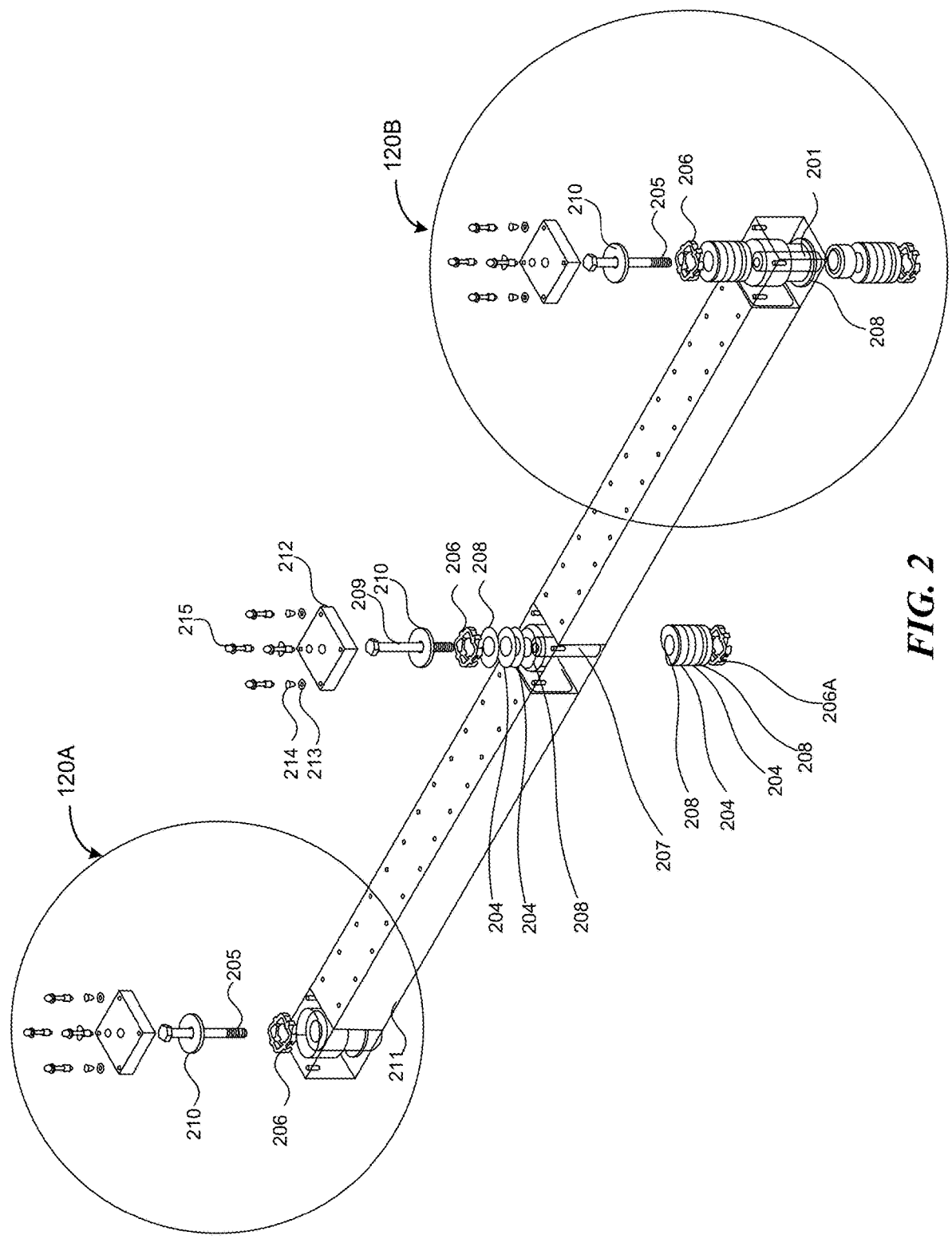
FIG. 2 depicts details of an example of a camera mounting structure for a vehicle with three attachment points, in accordance with some example embodiments.

FIG. 2 depicts details of an example of a camera mounting structure for a vehicle with three attachment points 120A, 120B, and 130, in accordance with some example embodiments. The camera mounting structure includes beam 211 which may be rectangular in cross-section, or trapezoidal, or another shape. The beam may be a metal extrusion such as aluminum or another metal, or may be another material such as plastic, carbon fiber, fiberglass, and so on.

Mounts 130, 120A, and 120B include elastomeric isolators 206 on the top and bottom of each mount with a bolt passing through each elastomer isolator 206. In some example embodiments, the elastomeric isolators may have a durometer between about 35A (e.g., value 35 on the "A" scale) and 75A. Vibrational energy that would be transmitted through the attachment points is absorbed by the elastomeric isolators so that the vibrations at the vehicle are attenuated at the camera mounting structure. For example, the vibrations from the vehicle may be attenuated by at least 10 dB at the camera mounting structure. The elastomeric isolators may have various shapes such as round, hexagonal, octagonal, waffle pattern, cone shape, or other shape. The elastomeric isolators are often circularly symmetric and may be solid or hollow. A hollow isolator may be made from an elastomeric material with air or a gas trapped inside the isolator, or air may pass freely or semi-freely into and out of the isolator. The elastomeric isolators may include more than one layer of a single shape or multiple layers with different shapes and/or made from different materials. For example, an elastomeric isolator may have two hexagonal layers rotated with respect to one another, or many other configurations. The elastomeric isolator may be made from polyurethane, rubber, closed cell foam, or similar material.

The durometer value (e.g., between 35A-75A) may be selected to tune the camera mounting system for a particular vehicle in order to reduce vibration of the cameras which will improve the image quality produced by the cameras. Different durometer values will produce different attenuation values as a function of frequency and accommodate different vibrational energy values. For example, a lower durometer material will attenuate more at lower frequencies than a higher durometer value but will accommodate lower energy values. The durometer of the material may be tailored to maximize attenuation of a vibration profile of the autonomous vehicle. In some implementations, the durometer value may be selected to be as low (as soft) as possible while attenuating the vibration profile of the vehicle including the frequencies and energies of the profile. The vibration profile of the vehicle can be measured on an operational vehicle or determined by analysis.

Bolt 205 of the end mounts and bolt 209 of the center mount pass through the center of end/center mounts and thread into a vehicle mount (see FIGS. 12-24). The vehicle mount may be different for different vehicles, but all vehicle mounts accept the bolts 205 and 209. The vehicle mounts may be rigidly attached to the vehicle and provide a rigid point to thread bolts 205/209 into.

Beam cap 212 may fit on top of bolt 205 or 209 and may be attached to mounts 120A, 120B and 130, via screws 215, flat washers 213, and lock washers 214. The beam cap 212 may be square (or another shape) with a hole in each corner for one of the screws 215.

In some implementations, center mount bolt 209 passes through several components that together attach the camera mounting structure to the vehicle and isolate vibrations at the vehicle from the camera mounting structure. An example of a stack of components for the center mount is described below. Although specific components are described in a specific order, additional, fewer, or different components may also be used, and/or the components may be put into a different order.

In the following example, the components are described below starting at the top of the center mount (farthest from the top of the vehicle). Bolt 209 may pass through two vibration isolators 206/206A, one near a top surface of the beam 211 and another near a bottom surface of the beam 211. A spacer 208 may be placed between the elastomeric isolators. Various washers such as flat washers, lock washers, Belleville washers, spherical washers, and additional spacers may be included in various combinations and orders in the stack of components on bolt 209. When bolt 209 is tightened to the vehicle mount, the elastomeric isolators are not significantly compressed and continue to provide vibration isolation. For example, the elastomeric isolators may be compressed by about 5%.

Shown in FIG. 2 is a specific stack of components on bolt 209. Under the head of bolt 209 is a flat washer 210 and under flat washer 210 is a first elastomeric isolator 206. Under the elastomeric isolator 206 are two Belleville washers 204. Under the Belleville washers 204 is spacer 208.

The Belleville washers may have a conical shape along the circumference of the inside of the washer compared to the outside that produces a spring constant with an associated force required to collapse the Belleville washer to being flat. In some implementations, the two Belleville washers may be aligned so that the conical shapes match thereby acting as a single Belleville washer with a spring constant that is twice the value of a single one of the Belleville washers. This is referred to as Belleville washers that are in parallel. In some other implementations the two Belleville washers may have their conical shapes 180 degrees out or alignment so that the spring constant is the same as a single Belleville washer and doubling the displacement needed to collapse both Belleville washers to being flat. This is referred to as Belleville washers that are in series. Combinations of in series and in parallel Belleville washers may also be used (not shown in FIG. 2).

Spacer 207 passes through spacer 208, Belleville washers 204, and elastomeric isolator 206. Spacer 207 has a hole that is centered in spacer 207 for bolt 209 to pass through. Spacers and flat washers both occupy longitudinal space along a bolt with a spacer generally occupying more longitudinal space that a flat washer.

Under the spacers is another pair of Belleville washers 204, another spacer 208, and a second elastomeric isolator 206A. Second elastomeric isolator 206A may be the same as elastomeric isolator 206 or may be different by using a different shape, material(s), and/or layers.

Figure 3:
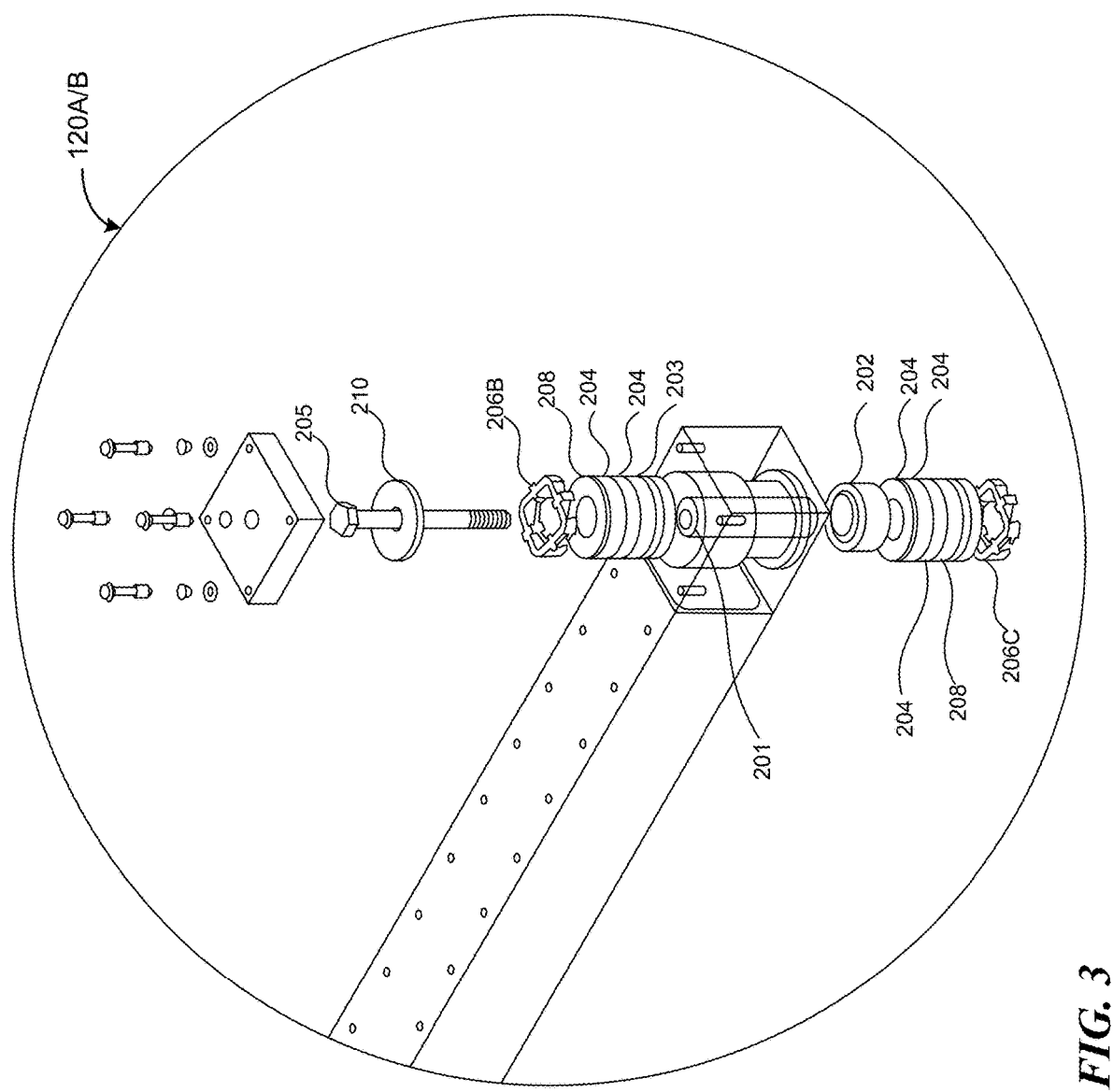
FIG. 3 depicts additional details of an example of an end mount at one end of a camera mounting structure for a vehicle with three attachment points, in accordance with some example embodiments.

In FIG. 2 end mounts 120A and 120B are shown with a subset of components. FIG. 3 details the end mounts 120A and 120B.

FIG. 3 depicts additional details of an example of an end mount 120A/B at one end of a camera mounting structure for a vehicle with three attachment points, in accordance with some example embodiments.

In some implementations, end mount bolt 205 passes through several components that together attach the camera mounting structure to the vehicle and isolate vibrations at the vehicle from the camera mounting structure. An example series of components is described below. Although specific components are described in a specific order, additional, fewer, or different components may also be used, and/or the components may be put into a different order.

The components described below start at the top of the end mount (farthest from the vehicle top). Bolt 205 may pass through two vibration isolators, 206B near a top surface of the beam 211 and 206C near a bottom surface of the beam 211. A spacer 201 may be placed between the elastomeric isolators. Spacer 201 may have an off-center hole which can be used for alignment of the camera mounting structure as further described below. For example, spacer 201 may be rotated about bolt 205 to shift the position of the mount according to the offset caused by the rotation. Various washers such as flat washers, lock washers, Belleville washers, spherical washers, and additional spacers may be included in various combinations and orders in the stack of components on bolt 205. When bolt 205 is tightened to the vehicle mount, the elastomeric isolators are not compressed and continue to provide vibration isolation. In some example embodiments a spherical bearing 202 may be included in the stack of components Shown in FIG. 3 is a specific stack of components on bolt 205. Under the head of bolt 209 is a flat washer 210 and under flat washer 210 is a first elastomeric isolator 206B. Under the elastomeric isolator 206B is spacer 208 and two Belleville washers 204 whose functionality is described above. Under the Belleville washers 204 is spherical washer 203 and spherical bearing 202.

Spherical bearing 202 and spherical washer 203 are used to compensate for static and dynamic angular misalignment between the left and right mounts 120A and 120B while maintaining the relative position of beam 211 to the vehicle. Spherical bearing 202 is adjustable in three dimensions including a rotation in azimuth, a rotation in elevation, and a rotation about the center of the spherical bearing. The rotation in azimuth and elevation are used to compensate for misalignment of the camera mounting structure with respect to the vehicle and misalignment caused by the vehicle mounts. Under the spherical bearing 202 are two Belleville washers 204 and spacer 208. Spherical washer 203 may be a two-piece washer with one piece being concave that mates with a second piece that is convex.

Offset spacer 201 may fit into spherical washer 203, Belleville washers 204, spacer 208 and elastomeric isolator 206. Offset spacer 201 has a hole in it for bolt 205 to pass through that is offset from the center. Offset spacer 201 compensates for minor misalignment of the vehicle mounts by translating the position of the camera mounting structure by rotating the offset spacer 201.

Under spacer 208 is a second elastomeric isolator 206C. Elastomeric isolator 206B may be the same as elastomeric isolator 206C and/or 206A, or may be different by using a different shape, material(s), and/or layers.

The spacers 201, 207, and 208 may be made from steel or another metal. Spacers 201 and 207 may allow beam 211 to 'float' vertically relative to the vehicle while maintaining a planar angular alignment. Belleville washers 204 and spacers 208 may be used to preload the three mounts 120A, 120B, and 130 relative to the vehicle. The combination of the preload and elastomeric isolators 206A-C reduces the transfer of vibration from the vehicle to the beam 211. Isolators 206A-C absorb vibrational energy thereby reducing the transmission of vertical and lateral vibrations from the vehicle to beam 211. In some example applications, vibrations may be primarily vertical with less vibration in a lateral direction relative to the vehicle. In some applications, the ratio of importance of vertical motion to lateral motion can range from 10:1 to 100:1.

In some implementations, the total length of the camera mounting structure may change about +/−0.25 inches due to temperature. For a two attachment point camera mounting structure, the side without a slot would not be displaced due to temperature and a camera at the other side of the structure could move +/−0.25 inches and a camera mounted in the center of the structure would be displaced +/−0.125 inches because the center will displace half the full displacement in a two attachment point system. For a three-attachment point camera mounting structure with the center mount not having a slot, each side could change in length about +/−0.125 inches.

Although the foregoing example details three attachment points, other numbers of attachments points may be used as well. Any number of attachment points two or greater may be used. For example, the number of attachment points may be 2, 3, 4, 5, and so on. As noted above, with three attachment points, one on each end of the camera mounting structure and one in the center, expansion/contraction can be accommodated by the end mounts. Different numbers of attachment points may include a different mount that does not have a slot. Generally, just one mount will not have a slot. If more than one mount did not have a slot, then expansion and contraction could not be accommodated without causing stress resulting in buckling or twisting of the camera mounting structure that would likely cause misalignment of the camera mounted to the camera mounting structure. For example, with an odd number of equally spaced attachment points, the center mount may be the attachment point without a slot which allows an equal length of the camera mounting structure on each side of the center mount thereby minimizing the expansion/contraction of the two sides. If the attachment point without a slot is toward one side where one side of the camera mounting structure from the attachment point without a slot is longer than the other, then the longer side will expand and contract more than the shorter side and more than the if the attachment point is at the center of the camera mounting structure. For an even number of equally spaced attachment points, there is no center attachment point, so one side from whichever attachment point has no slot will be longer than the other. In the case of two attachment points, one on each side of the vehicle, one side would not have a slot and the other side would have a slot. In all of the cases described above, as the mounting structure lengthens/shortens due to temperature, the closer a camera is to the attachment point without a slot, the smaller the displacement that the camera is moved due to the lengthening/shortening and the farther the camera is from the attachment point without a slot, the greater the camera is displaced due to the lengthening/shortening.

FIG. 4 depicts a table of example hardware for a camera mounting structure, in accordance with some example embodiments. In FIG. 4, the column labelled "Item Number" corresponds to the reference numerals on FIGS. 2 and 3. Although specific hardware is listed in FIG. 4, other hardware may be used instead of, or in addition to, the hardware listed (e.g., additional or fewer washers, additional isolators, different bolts, different spacers, a different bearing, and so on).

Figure 5:
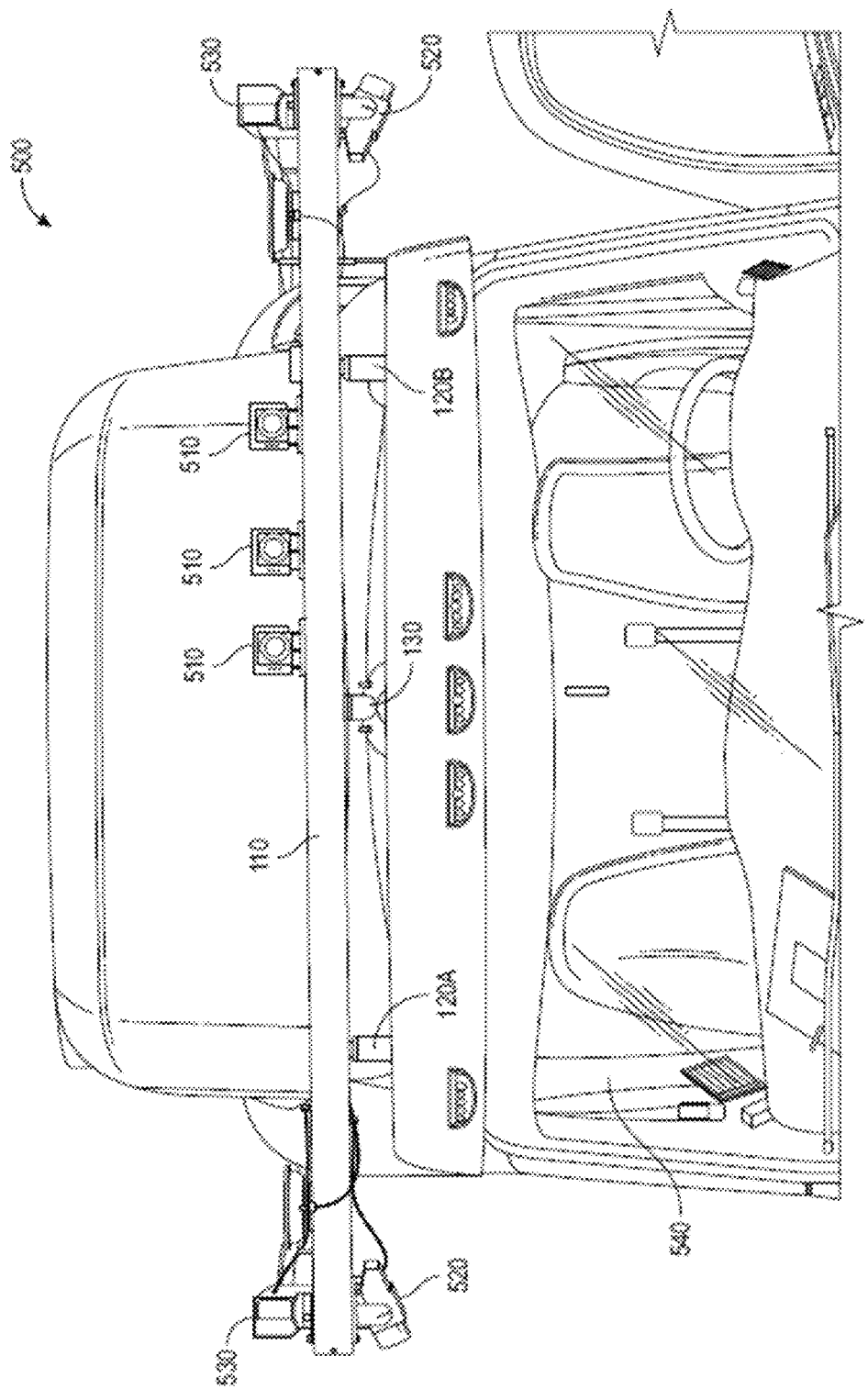
FIG. 5 depicts an image showing front view of a camera mounting structure attached to a truck, in accordance with some example embodiments.

FIG. 5 depicts an image 500 showing a front view of a camera mounting structure 110 attached to a truck, in accordance with some example embodiments. FIG. 5 shows end mounts 120A and 120B, and center mount 130 which attach the camera mounting structure 110 to truck 540. Several forward-facing cameras 510 are shown, as well as side viewing cameras 520 and rear viewing cameras 530. The cameras 510, 520, and 530 are each attached to the camera mounting structure 110. In various embodiments, any number of cameras between 1 and 20 may be attached to the camera mounting structure 110 with no difference, or almost no difference, in stability performance of the camera mounting structure. The cameras may be mounted asymmetrically with no difference, or almost no difference, in performance of the camera mounting structure 110. Although FIG. 5 shows camera mounting structure 110 mounted at the front of a truck, the structure can be mounted in other locations such as the back of the truck or trailer and/or at the sides of the truck or trailer.

Further disclosed in this patent document is an integrated multipurpose perception housing that can be mounted on a roof of a vehicle, such as a semi-trailer truck. For example, the camera mounting structure of FIGS. 1-5 may be integrated inside the integrated multipurpose perception housing. The integrated multipurpose perception housing provides a discrete and stable enclosure for cameras and/or sensors used for autonomous driving. The discrete enclosure allows cameras, sensors and/or other devices to be located within the integrated multipurpose perception housing so that such equipment does not draw as much attention as conventional mounting apparatus where cameras, sensors, and/or other devices are visibly mounted on top of a mounting apparatus installed on a roof of a vehicle. Furthermore, the stable enclosure allows cameras, sensors, and/or other devices to be securely and easily coupled to the integrated multipurpose perception housing at desired angles and locations so that the cameras, sensors, and/or other devices can obtain the desired field of views without needing as much calibration or adjustment compared to conventional mounting apparatus. An example of an integrated multipurpose perception housing is an integrated housing assembly described in this patent document.

Figure 6A:
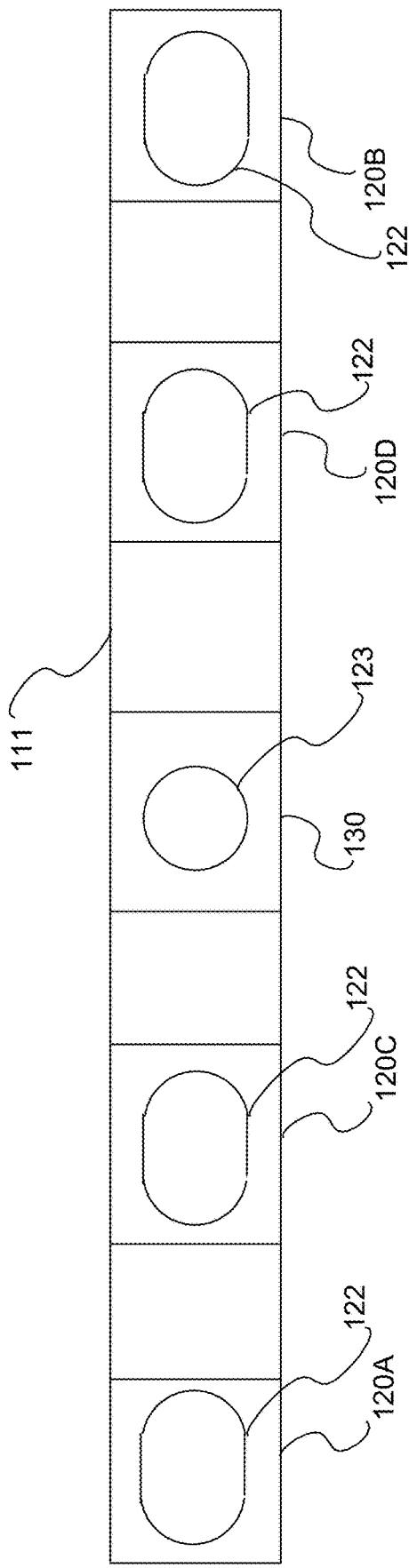
FIG. 6A depicts a bottom view of the camera mounting structure for a vehicle with five attachment points, in accordance with some example embodiments.
Figure 6B:
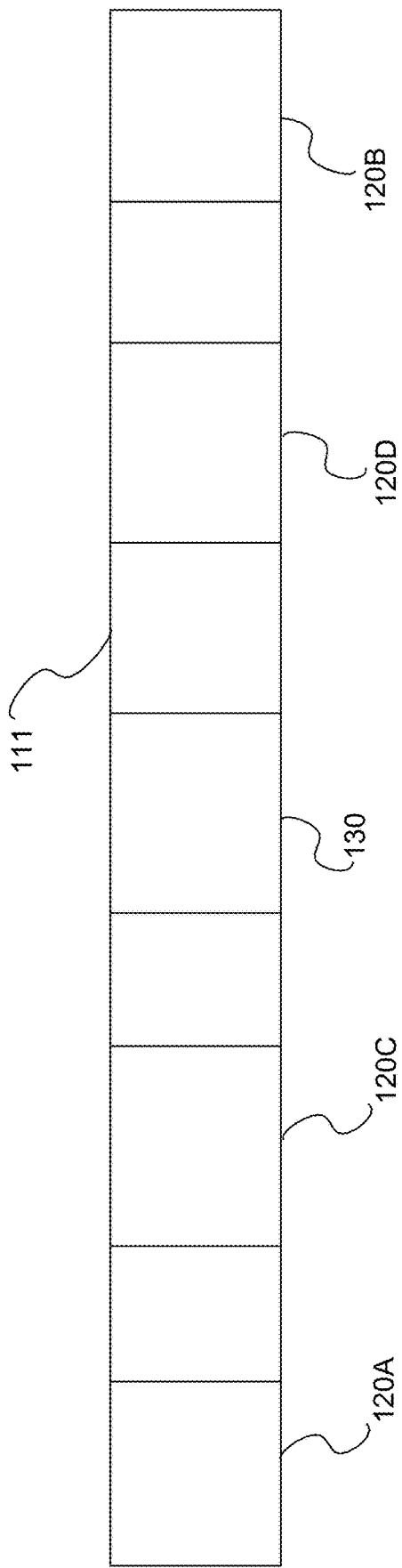
FIG. 6B depicts a top view of the camera mounting structure for a vehicle with five attachment points, in accordance with some example embodiments.

As an example of a camera mounting structure with a different number of attachment points, FIGS. 6A and 6B depict a camera mounting structure with five attachment points. Any other number of attachment points is also possible. FIG. 6A depicts a bottom view of the camera mounting structure 111 for a vehicle with five attachment points, in accordance with some example embodiments. The structure of the camera mounting structure shown in FIG. 6A is the same as FIGS. 1A-5 except with five attachment points instead of three. Center mount 130 is configured to not slide as in FIGS. 1A-5. End mounts 120A, 120B, and mounts 120C and 120D are configured to slide in obround openings 122 as in FIGS. 1A, 2, and 3. Mounts 120C and 120D have the same internal structure as end mounts 120A and 120B.

FIG. 6B depicts a top view of the camera mounting structure 111 for a vehicle with five attachment points, in accordance with some example embodiments. Shown in FIG. 6B are mounts 120A, 120B, 120C, 120D and 130. Center mount 130 is configured to not slide as in FIGS. 1A, 2, and 3. End mounts 120A, 120B, and mounts 120C and 120D are configured to slide in obround openings 122 as in FIGS. 1A-5. Mounts 120C and 120D have the same internal structure as end mounts 120A and 120B.

Figure 7:
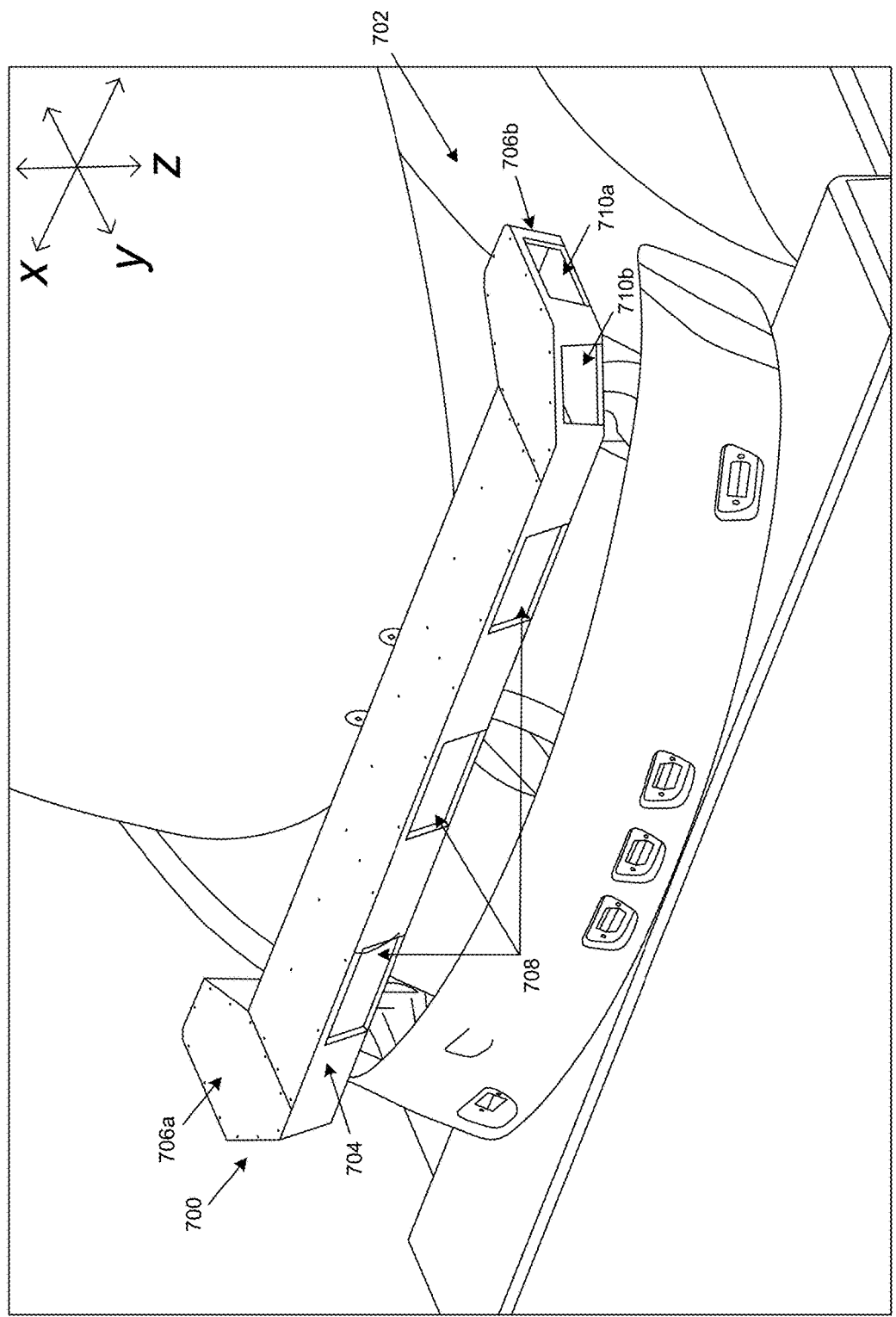
FIG. 7 depicts an example integrated housing assembly mounted on a front portion of a roof of a vehicle, in accordance with some example embodiments.

FIG. 7 shows an example integrated housing assembly 700 mounted on a front portion of a roof 702 of a vehicle. In FIG. 6, the integrated housing assembly 700 is coupled to one or more brackets located on top of a cab of a semi-trailer truck. By installing the integrated housing assembly 700 on the front portion of the roof 702, the cameras installed inside the integrated housing assembly and facing the openings 708 in the integrated housing assembly can obtain images of a driving environment in front of and/or on the sides of the semi-trailer truck. This patent document describes cameras being installed within the integrated housing assembly as an example. In some embodiments, sensors and/or other devices may be installed within the integrated housing assembly in a similar manner as the cameras described in this patent document. The top right-hand corner of FIGS. 7 and 9 includes a three-dimensional axis to further describe the dimensions of the parts of integrated housing assembly 700. Unless otherwise indicated, in this patent document the length of a part is generally determined along the x-axis, the width of a part is generally determined along the y-axis and the height of a part is generally determined along the z-axis.

The integrated housing assembly 700 includes a main enclosure 704 and two optional side enclosures 706a, 706b. The main enclosure 704 has openings 708 located in a front panel. The openings 708 allow cameras located inside the main enclosure 704 and facing towards the openings 708 to obtain images from one or more areas in front of the semi-trailer truck. The length of the main enclosure 704 can be less than the distance from one side of the vehicle to another side of the vehicle. The width and height of the main enclosure are determined based on the dimensions of the cameras that are to be installed inside the main enclosure 704.

The main enclosure 704 when viewed along the y-z plane can have a trapezoid-like shape with a top and bottom panel of the main enclosure 704 being parallel to each other, the rear panel of the main enclosure 704 being perpendicular to the top and/or bottom panels, and the front panel of the main enclosure 704 being angled towards the road or ground. Thus, the width of the top panel of the main enclosure 704 is greater than the width of the bottom panel of the main enclosure 704. A benefit of the angled front panel is that it can reduce the amount of direct sunlight directed to the lens of the cameras. The exemplary features of the main enclosure 704 are further described in FIG. 8.

In embodiments where the integrated housing assembly 700 includes the two optional side enclosures, a first side enclosure 706a can be coupled to one end of the main enclosure 704 and a second side enclosure 706b can be coupled to another end of the main enclosure. Each side enclosure can be a six-sided polygon as further described in FIG. 3. The width and height of one of the sides of the side enclosure can be the same as the width and height of a side panel of the main enclosure 704, so that when a side enclosure is coupled to the main enclosure 704, the top and bottom panels or surfaces of the side enclosure can be at the same level as the top and bottom panels or surfaces of the main enclosure 704.

The two side enclosures 706a, 706b include two front panels at an angle from each other, where the each of the two panels includes two openings 710a, 710b that allows cameras facing towards the openings 710a, 710b to obtain images of areas on each side of the semi-trailer truck. The two side enclosures 706a, 706b can be considered a driver side enclosure body and a passenger side enclosure body to distinguish and process the images obtained from cameras in the two side enclosures. The exemplary features of the side enclosure are further described in FIG. 3.

The integrated housing assembly may be an aluminum enclosure assembly with a white smooth high reflectivity exterior surface and a black rough anodized interior surface. A white high reflectivity exterior surface can reflect light from the sun and can thus allow the temperature inside the integrated housing assembly 700 to be less than the maximum operating temperature of the cameras installed inside the integrated housing assembly 700. A black rough interior surface can absorb stray light or light that can cause glare or other light pollution within the cameras installed inside the integrated housing assembly 700.

Figure 8:
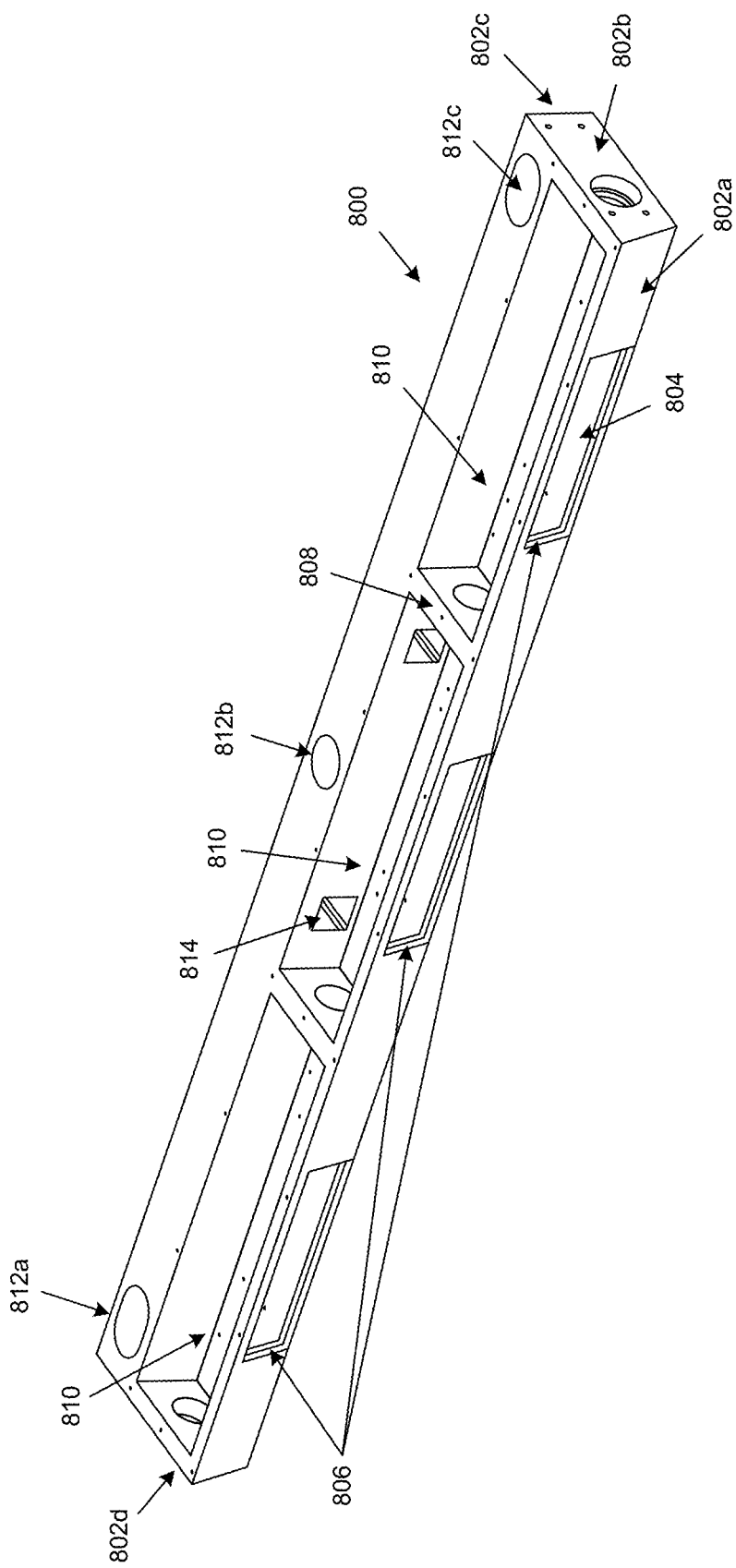
FIG. 8 depicts an exemplary main enclosure of the integrated housing assembly, in accordance with some example embodiments.

FIG. 8 describes an exemplary main enclosure 800 of the integrated housing assembly. The main enclosure 800 comprises a removable and flat top panel (not shown in FIG. 8), four flat panels 802a-802d that form the four sides of the main enclosure 800, and a removable and flat bottom panel 804. The main enclosure 800 without its top and bottom panels can have a flat rectangular top surface and a flat rectangular bottom surface. As mentioned above, the main enclosure 800 when viewed along the y-z plane can have a trapezoid-like shape. Thus, the top and bottom surfaces of the main enclosure 800 can be parallel to each other and the top and bottom surfaces of the main enclosure 800 can be perpendicular to a rear panel 802c. The edge of the rear panel 802c can be seen in FIG. 8. The main enclosure 800 can be machined from a single block of aluminum or another metal with the four panels 802a-802d and with the openings 806, cavities 810, and various holes shown in FIG. 8. Thus, in some embodiments, the four panels 802a-802d are not removable and are a part of the structure that forms the main enclosure 800.

The top and bottom surfaces of the main enclosure 800 are covered by the top panel and the bottom panel 804, respectively. FIG. 8 shows the main enclosure 800 without its top panel to more clearly describe the features of the main enclosure 800. The top panel of the main enclosure 800 is seen in FIG. 6 and has a rectangular shape that corresponds to the rectangular shape of the top surface of the main enclosure 800. In FIG. 8, the bottom panel 804 can be seen through the openings 806 of the front panel 802a. The bottom panel has a rectangular shape that extends from the bottom edge of the front panel 802a up until the holes 812a-812c that include an inner wall with a protrusion (as further described in FIG. 10). The bottom panel does not extend over the holes 812a-812c so that a vibration and fastener kit (described in FIGS. 10 and 10) can be inserted in the holes 812a-812c to couple the main enclosure to one or more brackets on a vehicle (as described in FIG. 10). The top and bottom surfaces of the main enclosure 800 include a plurality of threaded screw holes located around the periphery of the three cavities 810 to couple the top and bottom panels to the main enclosure 800. The top and bottom panels may be coupled to the respective top and bottom surfaces of the main enclosure 800 using screws.

The width of the top surface of the main enclosure 800 is greater than the width of the bottom surface of the main enclosure 800 in part because the front panel 802a is angled towards the road or ground. The front panel 802a is designed to have a pre-determined obtuse angle (e.g., greater than 90°) relative to the bottom panel 804. In some embodiments, the angle formed between the front panel 802a and the bottom panel 804 may be approximately 160°.

FIG. 8 shows that the front panel 802a has three separate openings 806 or three separate areas that are cut out from the front panel 802a. The three openings 806 are located next to each other on the front panel 802a. Each opening 806 has a rectangular shape and each opening is separated from another adjacent opening by some distance. Between each opening is a flat frame portion that comprises the front panel 802a. In some embodiments, each opening 806 on the front panel 802a may extend from the top surface to the bottom surface of the main enclosure 800. Each opening 806 leads to a cavity located behind the front panel 802a. A plurality of openings in the front panel 802a may be referred to a plurality of sub-openings. In some embodiments, the main enclosure 800 may have a single cavity accessible via a single opening in the front panel 802a. In some embodiments, the main enclosure 800 may have two or more sub-cavities, and the front panel 802a may have two or more corresponding sub-openings, where each sub-cavity in the main enclosure 800 is accessible via a separate sub-opening in the front panel 802a.

Figure 10:
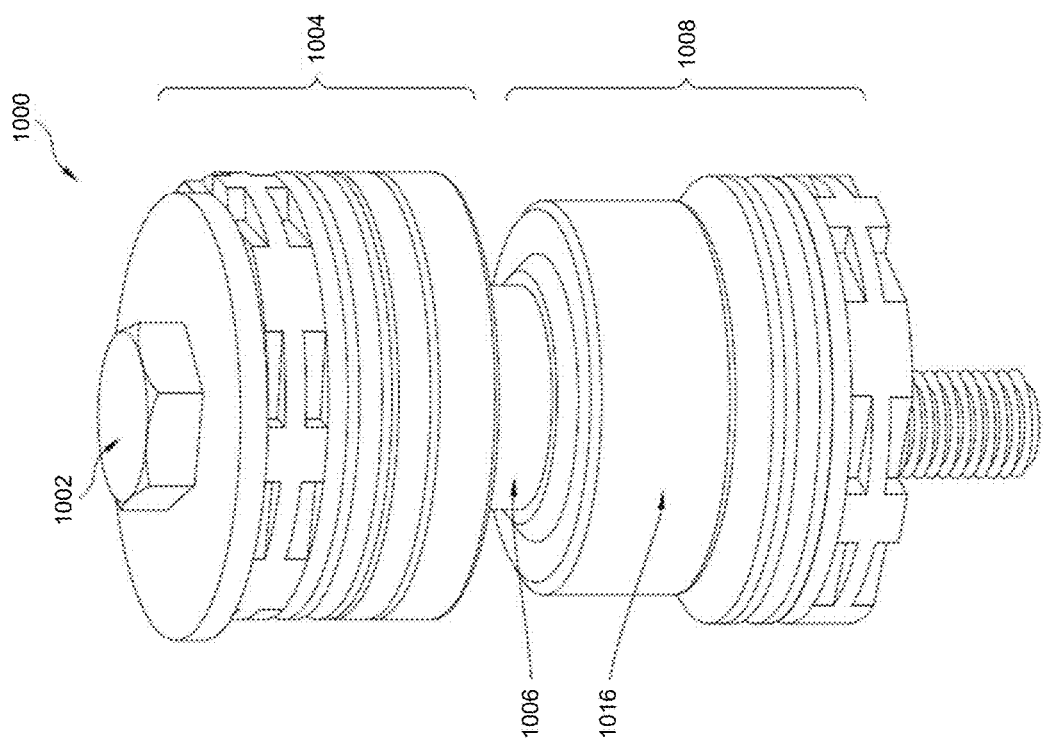
FIGS. 10 and 11 show an exemplary design for a vibration and fastener kit used to couple the integrated housing assembly to a vehicle, in accordance with some example embodiments.

A front region of the main enclosure 800 includes three cavities located behind each of the three openings 806. One of the cavities 810 is identified in FIG. 8. A rear region of the main enclosure behind the three cavities includes a solid region that includes three holes 812a-812c that extend vertically along the entire height of the main enclosure 800. Two of the holes 812a, 812c are located on either side of the main enclosure 800 and one of the hole 812b is located in a middle of the length of the main enclosure. The two outer holes (also referred to herein as slots) 812a, 812c can have an obround shape to allow for manufacturing tolerancing and/or thermodynamic change such as thermal expansion of the main enclosure 800, and the middle hole 812b can have a circular shape that can allow the main enclosure 800 to be centered in a middle portion of a roof of a vehicle (as shown in FIG. 6). Slots 812a and 812c are the same or similar to obround openings 122 shown in FIG. 1B. In some example embodiments, the main enclosure 800 incorporates camera mounting structure 110 with the obround openings 122 corresponding to slots 812a and 812c and round opening 123 corresponding to round hole 812b. The cross-section of the main enclosure 800 with holes 812a-812c is shown in FIG. 10 where the through hole has a protrusion (650 in FIG. 7) at a depth less than the height of the main enclosure 800. A width of each cavity 810 is less than the width of the main enclosure 800 to allow a rear region of the main enclosure to have the holes 812a-812c. The length of each cavity 810 can be greater than the length of its corresponding opening 806 in the front panel 802a, and the height of each cavity 810 can be the same as the height of the main enclosure 800. A plurality of cavities may be referred to as a plurality of sub-cavities.

Each cavity 810 has four side walls, where one of the walls forms part of the front panel with an opening. The two cavities on either ends of the main enclosure 800 share one of their respective walls with the two side panels 802b, 802d. Thus, the interior surface of the side panel 802b forms one of the walls of a cavity on one end of the main enclosure 800, and the interior surface of the side panel 802d forms one of the walls of a cavity on the opposite end of the main enclosure 800. The cavity is enclosed on top and bottom by the removable top panel and the removable bottom panel 804. The length, width, and height of a cavity is designed to allow one or more cameras with their electrical cabling to be installed in the cavity. For example, three cameras may be installed in each cavity where one of the cameras may be recording images and the other two cameras may be redundant or backup cameras.

FIG. 8 shows that a rear wall of a middle cavity includes two through holes 814 that extends width-wise or along the y-axis from the rear wall of the middle cavity to the rear panel 802c. One of the through holes 814 is identified in FIG. 8 and is shown to have a square-like shape. The through holes 814 allow electrical cabling to be inserted through the main enclosure 800 to the middle cavity. The electrical cabling allows the cameras to receive power from and to provide images to a signal processing unit located in the vehicle on which the main enclosure 800 in installed.

Each cavity can be separated by an adjacent cavity by a sidewall 808 that include a single through hole that extends length-wise or along the x-axis to allow part of the electrical cabling inserted into the main enclosure 800 to be routed through the sidewall 808 to the cameras located in the other cavities. A benefit of having a middle cavity include two through holes is that it facilitates better cable management so that two cable bundles can be inserted into the main enclosure and can be routed to the other cavities via the through holes in the sidewalls 808. A benefit of the sidewall 808 is that it can provide structural rigidity in a middle region of the main enclosure 800 and can allow for electrical cables to be routed from one cavity to another cavity. In some embodiments, a rear wall of each cavity may include a through hole that extends from the rear wall of each cavity to the exterior surface of the rear panel 802c.

FIG. 8 shows that the two side panels 802b, 802d form the two ends of the main enclosure 800, where one of the walls of the two cavities located on opposite sides of the main enclosure 800 includes one of the side panels 802b, 802d. Each side panel 802b, 802d includes a through hole that extends length-wise or along the x-axis from inside each of the two cavities to the exterior surface of the side panels 802b, 802d. A benefit of having each side panel 802b, 802d with a through hole is that it allows the electrical cabling inserted through the through holes 814 to be routed through the through hole in the sidewalls 808 and through the side panels 802b, 802d to the optional side enclosures further described in FIG. 3. The exterior surface of the side panels 802b, 802d include a plurality of screw holes to couple the two optional side enclosures to the side panels 802b, 802d of the main enclosure.

Figure 9:
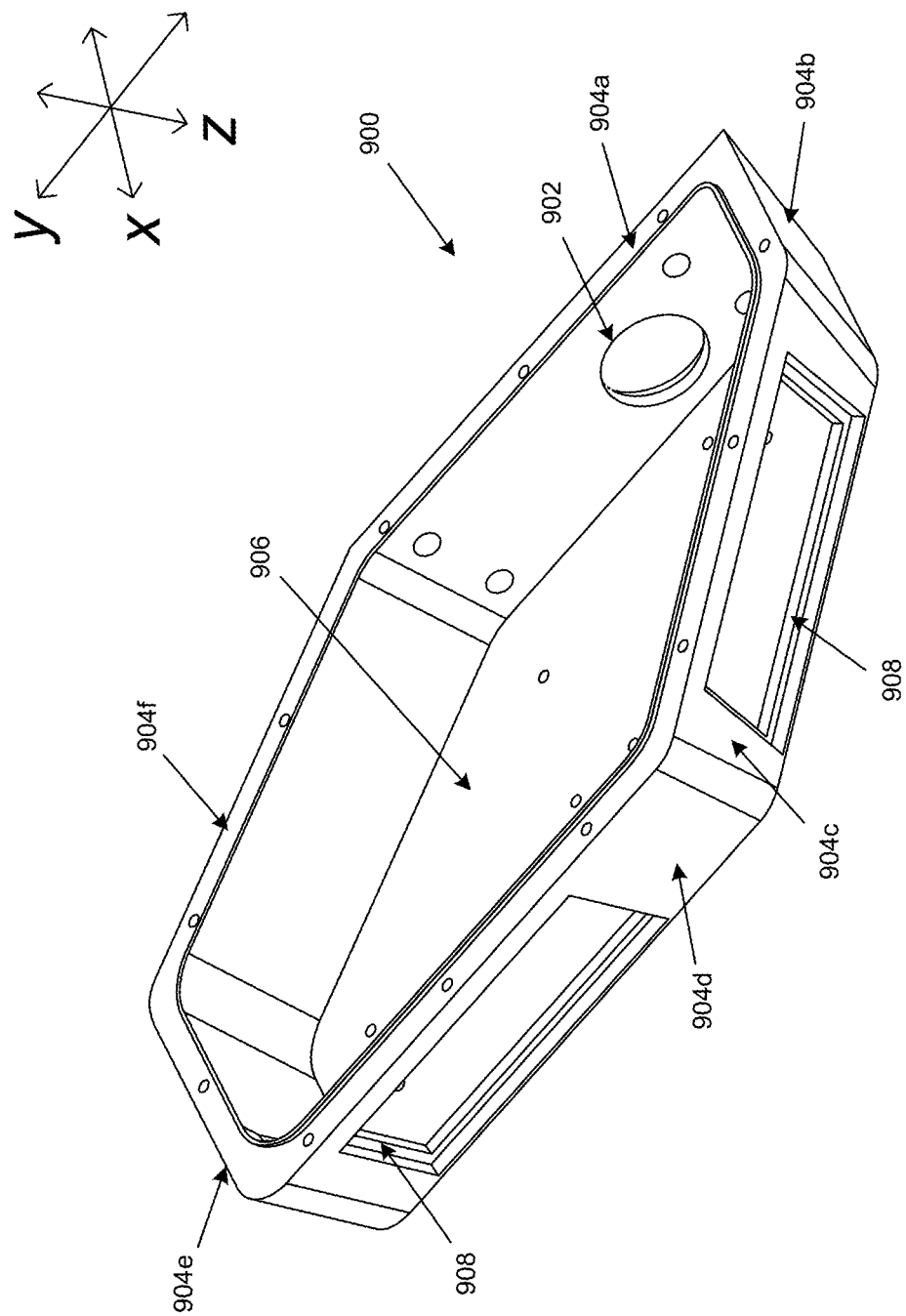
FIG. 9 depicts an exemplary and optional side enclosure of the integrated housing assembly, in accordance with some example embodiments.

FIG. 9 describes an exemplary side enclosure 900 of the integrated housing assembly. Each of the two optional side enclosures shown in FIG. 6 can have the same design as shown in FIG. 9. The side enclosure 900 comprises a removable and flat top panel (not shown in FIG. 9), six flat panels 904a-904f that form the six sides of the side enclosure 900, and a removable and flat bottom panel 906. The side enclosure 900 without its top and bottom panels has a flat top surface and a flat bottom surface. The top and bottom surfaces of the side enclosure 900 can be parallel to each other.

The side enclosure 900 can have six panels that form a six-sided polygon. One of the side panel 904a of the side enclosure 900 includes a through hole 902 that extends along the x-axis to allow electrical cabling inserted through the side panel of the main enclosure to be inserted into the side enclosure 900. As shown in FIG. 9, the side panel 904a that includes the through hole 902 also includes a plurality of screw holes to couple a side enclosure 900 to a side panel of the main enclosure. The width and height of the side panel 904a can be the same as the width and height of a side panel of the main enclosure, so that when a side enclosure 900 is coupled to the main enclosure, the top and bottom panels of the side enclosure can be at the same level as the top and bottom panels of the main enclosure.

The top and bottom surfaces of the side enclosure 900 are covered by a top panel and the bottom panel 906, respectively. FIG. 9 shows the side enclosure 900 without its top panel to more clearly describe the features of the side enclosure 900. The top panels of the side enclosures are seen in FIG. 6 and has a six-sided shape that corresponds to the six-sided shape of the top surface of the side enclosures 900. The bottom panel 906 has a six-sided shape that corresponds to the six-sided shape of the bottom surface of the main enclosure 900. The top and bottom surface of the side enclosure 900 include a plurality of screw holes located around the periphery of a cavity of the side enclosure 900 to couple the top and bottom panels to the side enclosure 900. The top and bottom panels may be coupled to the respective top and bottom surface of the main enclosure 900 using screws.

The surface area of the top surface of the side enclosure 900 is greater than the surface area of the bottom surface of the side enclosure 900 in part because two adjacent side panels 904c and 904d are angled towards the road or ground. The two side panels 904c, 904d are designed to have a pre-determined obtuse angle (e.g., greater than 90°) relative to the bottom panel 906. In some embodiments, the angle formed between the two side panels 904c, 904d and the bottom panel 906 may be 160°.

The side panel 904a is parallel to a side panel 904d with an opening 908. Such a design allows cameras placed in the side enclosure and facing towards the opening 908 of side panel 904d to obtain images of an area on a side of a vehicle. As shown in FIG. 6, one of the opening 110a in the side enclosure 106b faces an area to the side of the vehicle. In FIG. 9, the side panel 904a and the side panel 904c with an opening 902 are connected via another side panel 904b. The side panel 904c forms an angle of 45° relative to the side panel 904a. Such a design allows cameras placed in the side enclosure and facing towards the opening 908 of side panel 904c to obtain images of an area on a front and side of a vehicle. As shown in FIG. 6, one of the opening 110b in the side enclosure 106b faces an area to the front and side of the vehicle. The side panel 904d is connected to side panel 904c on one side and side panel 904e on another side. In some embodiments, an angle formed between the two side panels 904c and 904d may be 135°. Side panel 904e can be parallel to 904b. Side panel 904f connects side panel 904e and side panel 904a.

FIG. 9 shows that each of the two side panels 904c, 904d has an opening 908 or an area that is cut out. Each opening 906 has a rectangular shape. The two openings 906 leads to a single cavity located behind the two side panels 904c, 904d. The height of the cavity in the side enclosure 900 can be the same as the height of the side enclosure 900.

The interior surface of the side panels 904a-904f forms the walls of a cavity in the side enclosure 900. The cavity is enclosed on top and bottom by the removable top panel and the removable bottom panel 804. The volume of the cavity in the side enclosure 900 is designed to allow one or more cameras with their electrical cabling to be installed in the cavity. For example, three cameras may be installed in the cavity of the side enclosure 900 where one of the cameras may be recording images and the other two cameras may be redundant or backup cameras.

The side enclosure 900 can be machined from a single block of aluminum or another metal with the six panels 904a-904f and with the openings 908, cavity formed within the six panels and top and bottom panels, and the through hole 902 shown in FIG. 9. Thus, in some embodiments, the six panels 904a-904f are not removable and are a part of the structure that forms the side enclosure 900.

Figure 11:
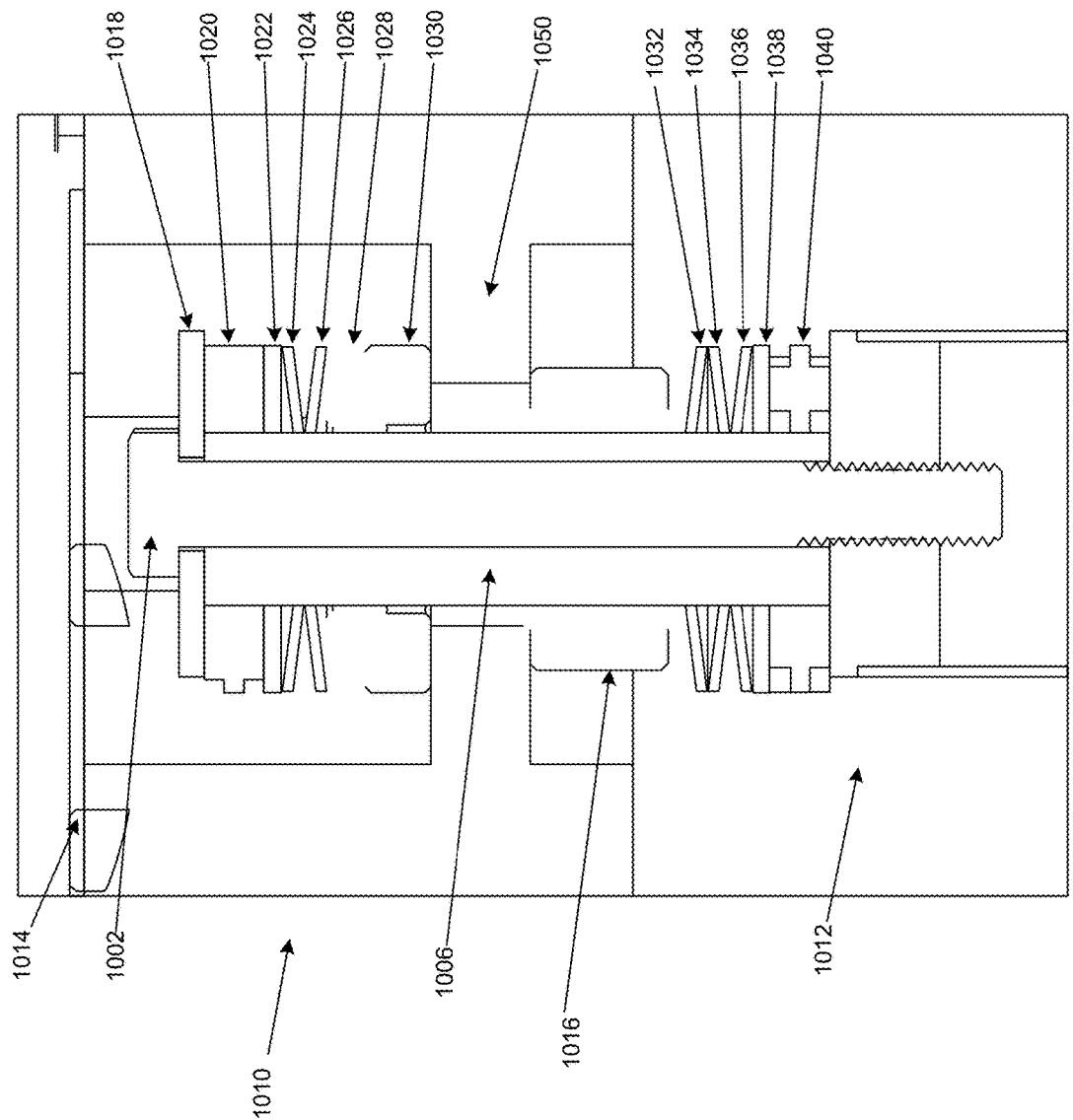

FIGS. 10 and 11 show an exemplary design for a vibration and fastener kit or assembly 1000 used to couple the integrated housing assembly to a vehicle. FIGS. 10 and 11 depict a vibration isolation mount similar to 120A, 120B, and 130. FIG. 10 shows a complete vibration and fastener kit 1000. The kit 1000 includes a threaded screw 1002, a first set of a plurality of washers 1004, a cylinder 1006 that through which the threaded screw 1002 is inserted, and a second set of a plurality of washers. As shown in FIG. 11, the second set of a plurality of washers includes a ball joint swivel bearing or spherical bearing 1016 that is wedged between a protrusion in the through hole and a bracket on top of a vehicle.

FIG. 11 shows a vertical cross-section of a main enclosure 1010 of the integrated housing assembly coupled to a single bracket 1012 on top of a vehicle via the vibration and fastener kit 1000. As mentioned above, the kit 1000 is inserted through each of the three through holes (812a-812c in FIG. 8) of the main enclosure. A vertical cross-section of the main enclosure 1010 shows one of the through holes of the main enclosure. The design of the other two through holes of the main enclosure is the same as the through hole shown in FIG. 11. The through hole shown in FIG. 11 includes a protrusion 1050 at a depth that is less than the height of the through hole. The protrusion 1050 extends from the inside wall of the through hole. The protrusion 1050 has a hole that extends from a side facing the top panel 1014 on top of the through hole to the side facing the bracket 1012.

As shown in FIG. 11, when the screw 1002 is inserted within the through hole and screwed into the bracket 1012, there is a gap between the top of the screw 1002 and the bottom surface of the top panel 1014. This gap allows the top panel 1014 to be coupled to the main enclosure 1010 without having any mechanical interference from the vibration and fastener kit 1000.

FIG. 11 further describes the stack of the two sets of washers 1004, 1008 that are designed to minimize the effects of vibration and tolerancing on the main enclosure similar to the stack up or elements shown in FIGS. 2 and 3. A first set of a plurality of washers are located above the protrusion 1050 and includes an ordered set of the following washers from top to bottom: flat washer 1018, elastomeric isolator or rubber washer 1020, flat washer 1028, two disk washers or Belleville 1024, 1026 disposed with the curved side facing each other (shown in FIG. 10), and two leveling washers or spherical washers 1028, 1030. A ball joint swivel bearing and a second set of a plurality of washers are located below the protrusion 1050 in the following ordered set from top to bottom: a ball joint swivel bearing or spherical bearing 1016, three disk washers or Belleville washers 1032, 1034, 1036, a flat washer 1038, and a rubber washer or elastomeric isolator 1040.

Figure 12:
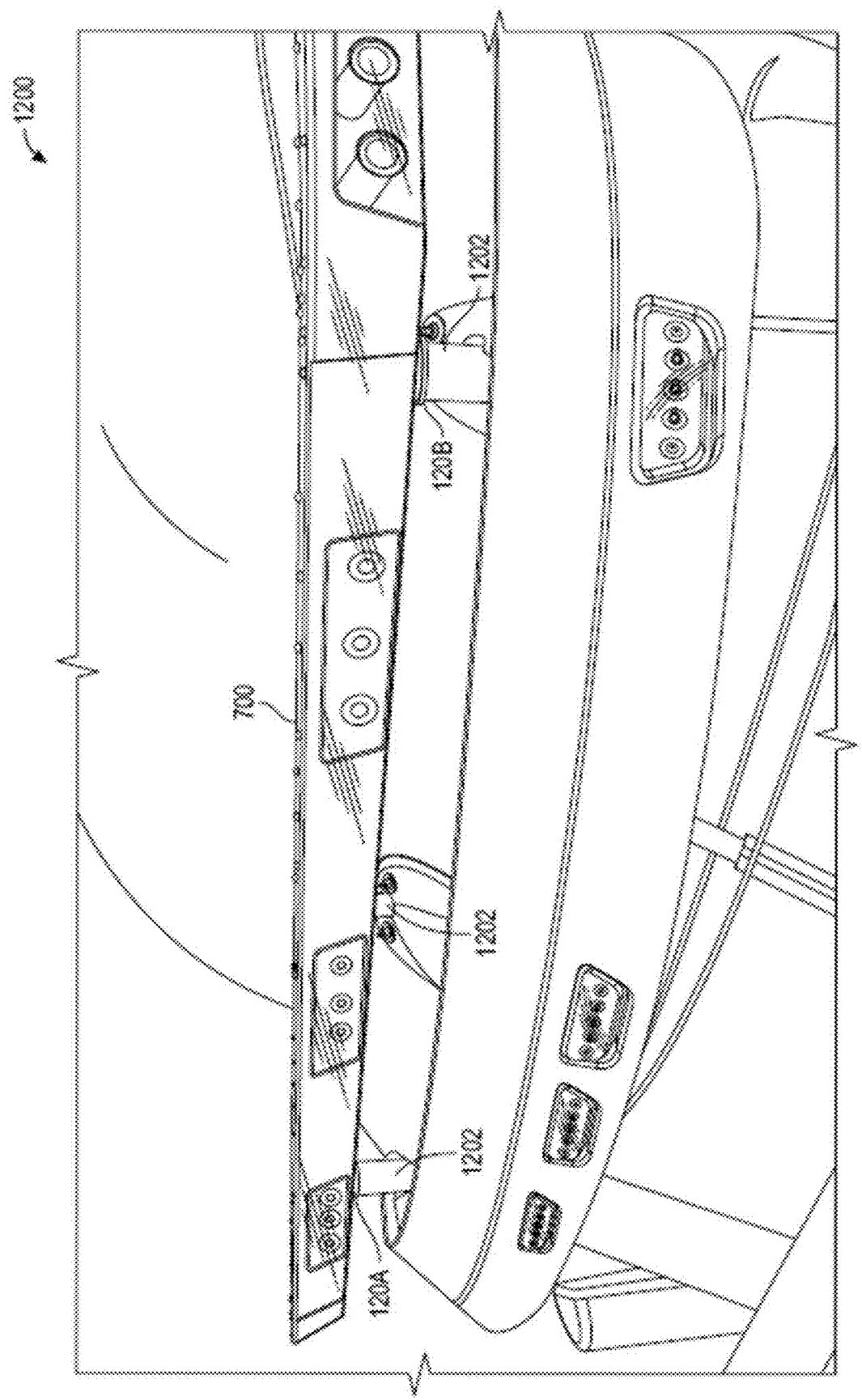
FIG. 12 depicts an example image of a front view of an integrated housing assembly mounted on a front portion of a roof of a vehicle, in accordance with some example embodiments.

FIG. 12 at 1200 shows an example image of a front view of an integrated housing assembly mounted on a front portion of a roof of a vehicle, in accordance with some example embodiments. The description of FIG. 12 also refers to FIGS. 1-11. Shown are end mounts 120A and 120B attached to vehicle mounts 1202 attaching integrated housing assembly 700 to a truck. Integrated housing assembly 700 contains camera mounting structure 110 (not shown) and associated camera and sensors.

Figure 13:
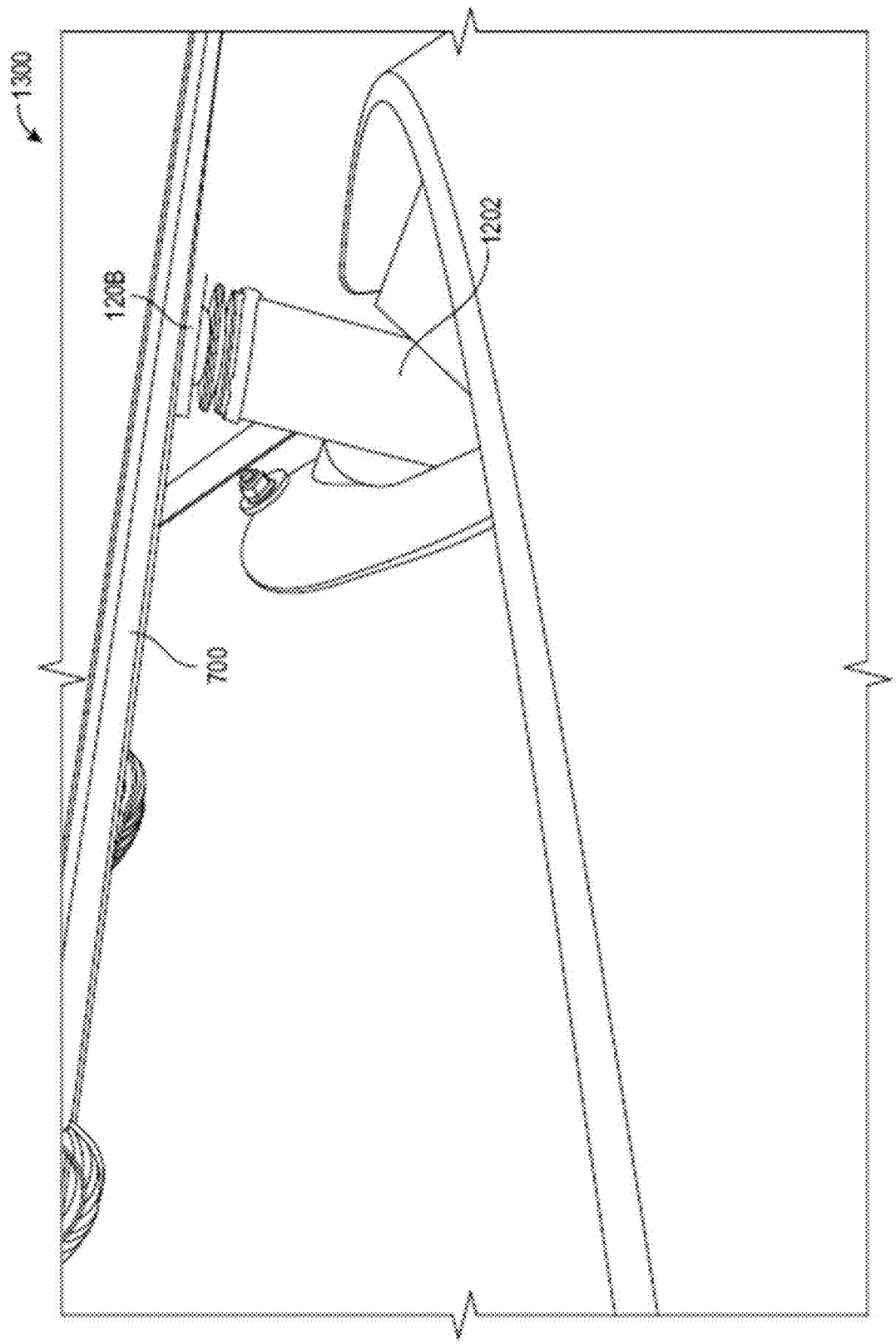
FIG. 13 depicts an example image underneath an integrated housing assembly mounted on a front portion of a roof of a vehicle, in accordance with some example embodiments.

FIG. 13 shows an example image underneath an integrated housing assembly mounted on a front portion of a roof of a vehicle, in accordance with some example embodiments. The description of FIG. 13 also refers to FIGS. 1-11. Shown is end mount 120B attached to vehicle mount 1202 attaching integrated housing assembly 700 to a truck. Integrated housing assembly 700 contains camera mounting structure 110 (not shown) and associated camera and sensors.

Figure 14:
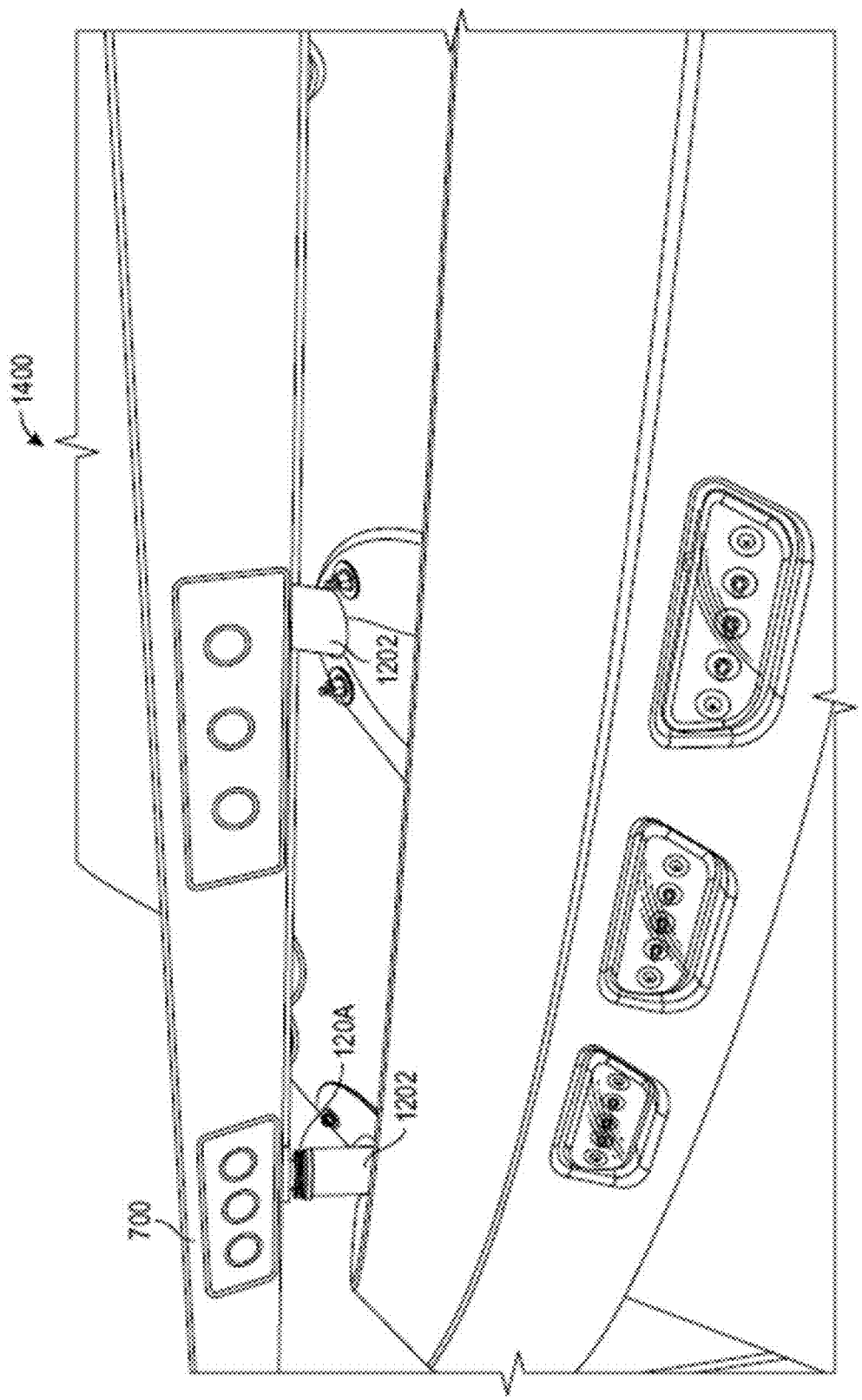
FIG. 14 depicts another example image of a front view of an integrated housing assembly mounted on a front portion of a roof of a vehicle, in accordance with some example embodiments.

FIG. 14 shows another example image of a front view of an integrated housing assembly mounted on a front portion of a roof of a vehicle, in accordance with some example embodiments. The description of FIG. 14 also refers to FIGS. 1-11. Shown is end mount 120A attached to vehicle mount 1202 and center mount 130 attached to vehicle mount 1202, both attaching integrated housing assembly 700 to a truck. Integrated housing assembly 700 contains camera mounting structure 110 (not shown) and associated camera and sensors.

Figure 15:
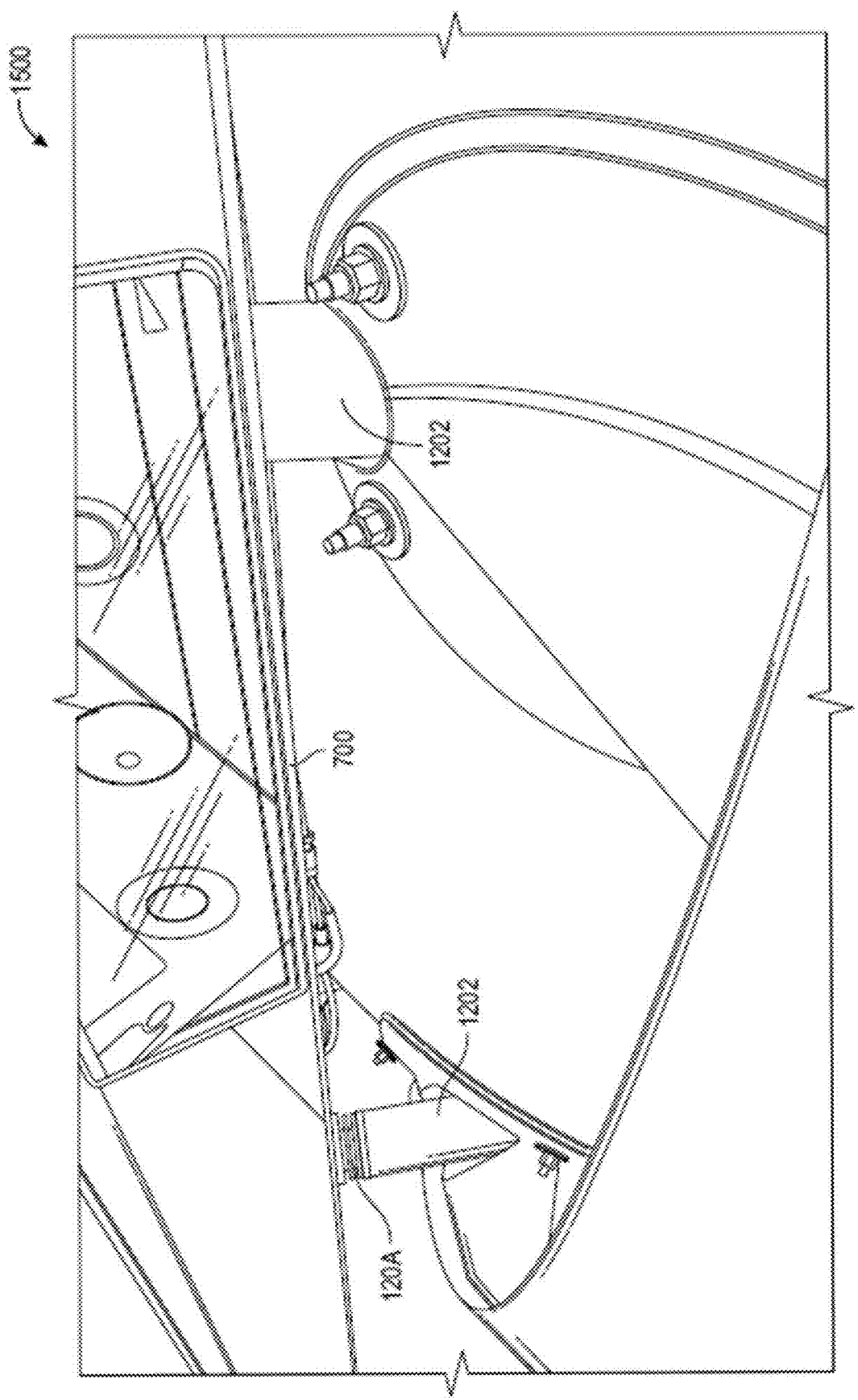
FIG. 15 depicts another example image underneath an integrated housing assembly mounted on a front portion of a roof of a vehicle, in accordance with some example embodiments.

FIG. 15 shows another example image underneath an integrated housing assembly mounted on a front portion of a roof of a vehicle, in accordance with some example embodiments. The description of FIG. 15 also refers to FIGS. 1-11. Shown is end mount 120A attached to vehicle mount 1202 and center mount 130 (not visible) attached to vehicle mount 1202, both attaching integrated housing assembly 700 to a truck. Integrated housing assembly 700 contains camera mounting structure 110 (not shown) and associated camera and sensors.

Figure 16:
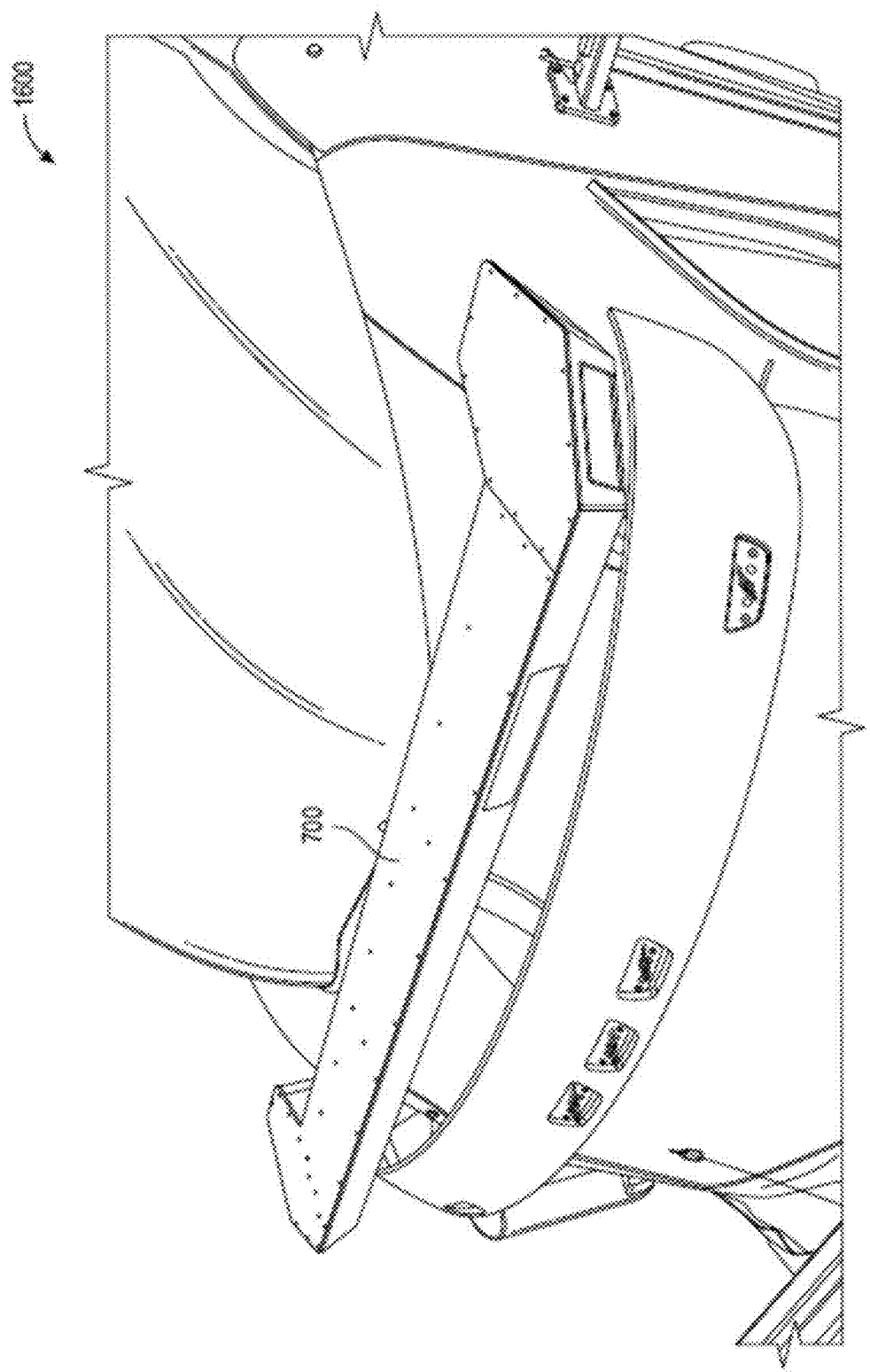
FIG. 16 depicts an example image of a top view of an integrated housing assembly mounted on a front portion of a roof of a vehicle, in accordance with some example embodiments.
Figure 17:
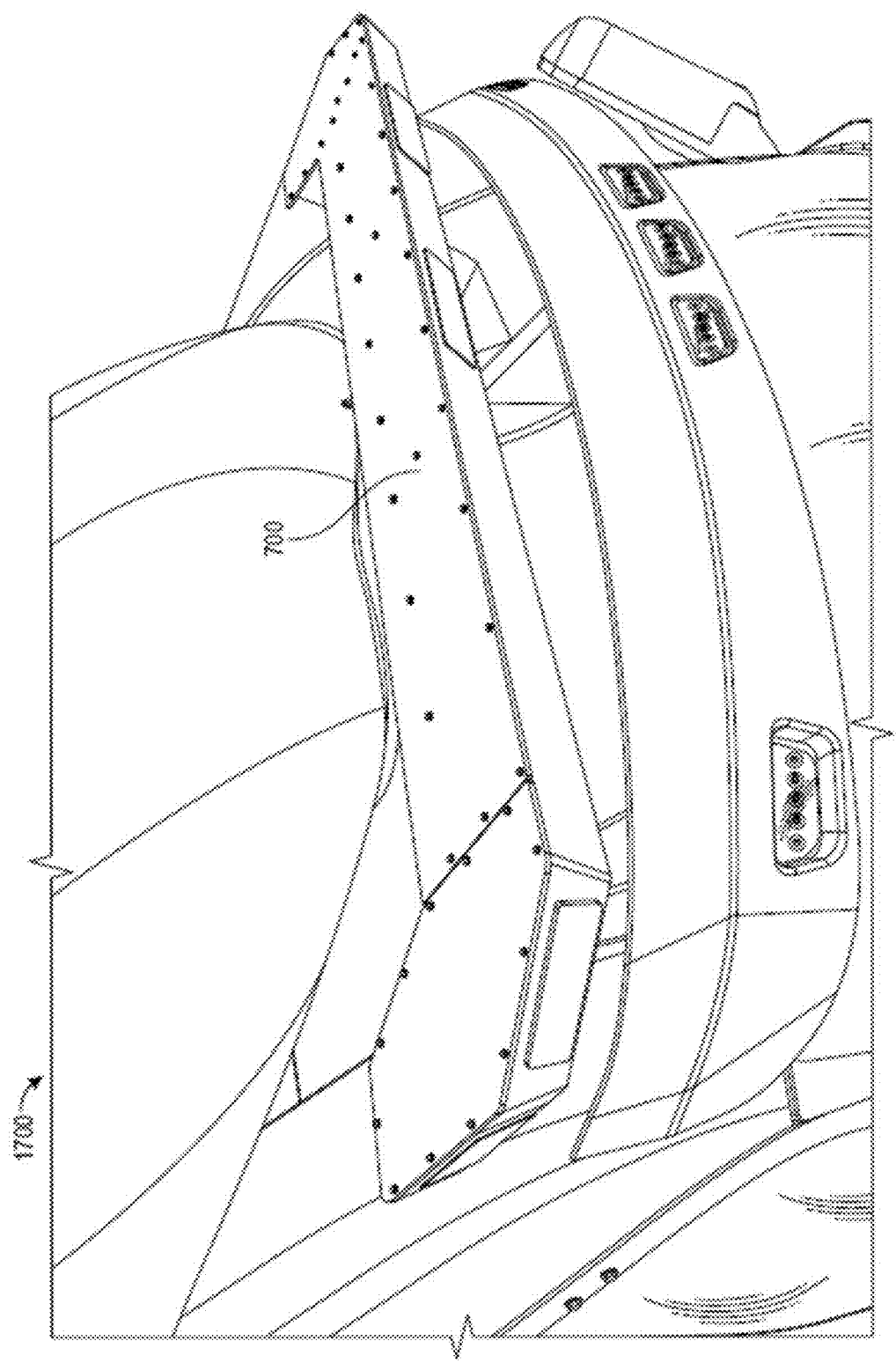
FIG. 17 depicts another example image of a top view of an integrated housing assembly mounted on a front portion of a roof of a vehicle, in accordance with some example embodiments.

FIGS. 16 and 17 show example images of a top views of an integrated housing assembly mounted on a front portion of a roof of a vehicle, in accordance with some example embodiments. The description of FIG. 15 also refers to FIGS. 1-11. Shown is integrated housing assembly 700 mounted to a truck. Integrated housing assembly 700 contains camera mounting structure 110 (not shown) and associated camera and sensors.

Figure 18:
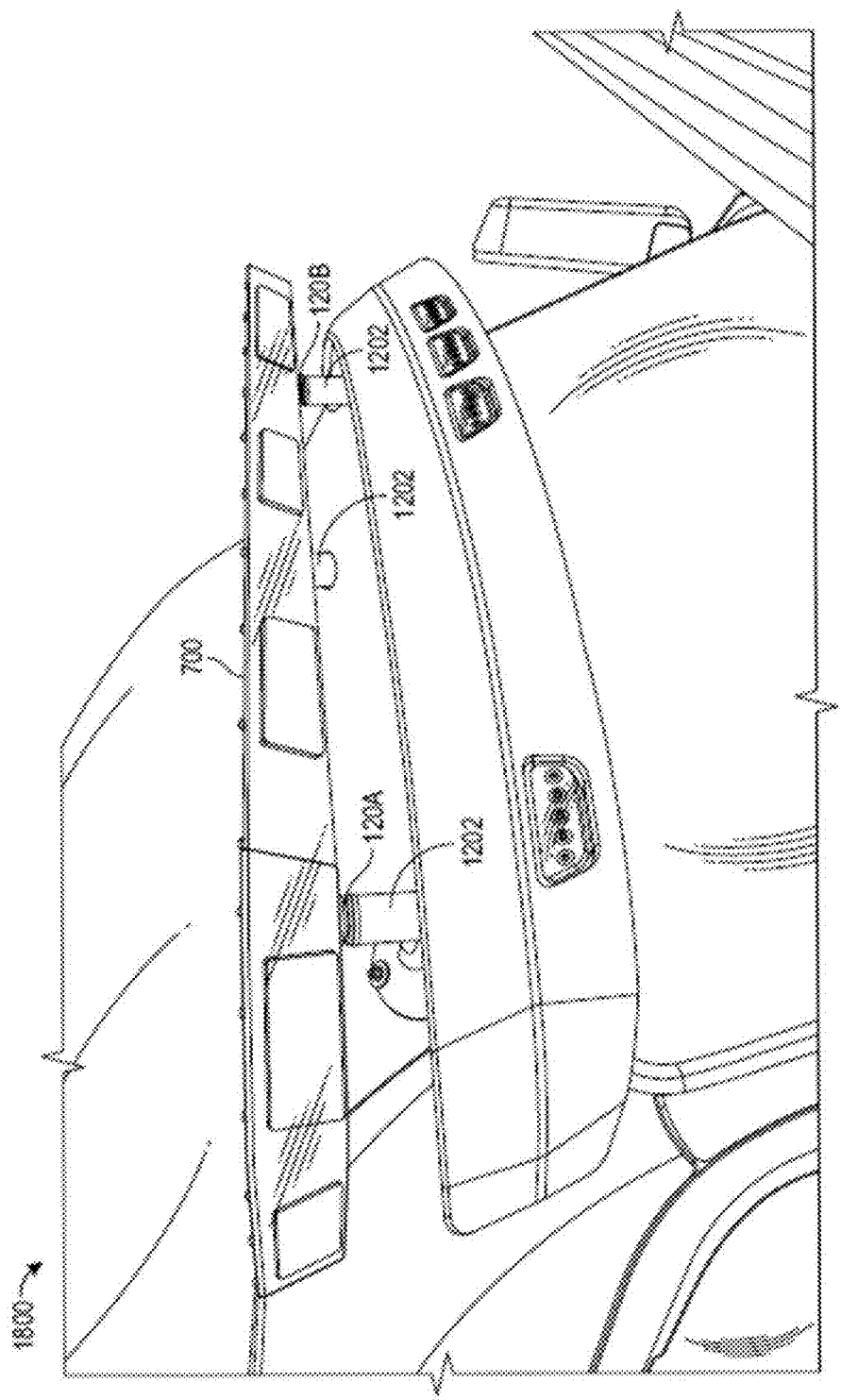
FIG. 18 depicts an example image of a side view of an integrated housing assembly mounted on a front portion of a roof of a vehicle, in accordance with some example embodiments.

FIG. 18 shows an example image of a side view of an integrated housing assembly mounted on a front portion of a roof of a vehicle, in accordance with some example embodiments. The description of FIG. 18 also refers to FIGS. 1-11. Shown are end mounts 120A and 120B each attached to a vehicle mount 1202 and center mount 130 (not visible) attached to vehicle mount 1202, all attaching integrated housing assembly 700 to a truck. Integrated housing assembly 700 contains camera mounting structure 110 (not shown) and associated camera and sensors.

Figure 19:
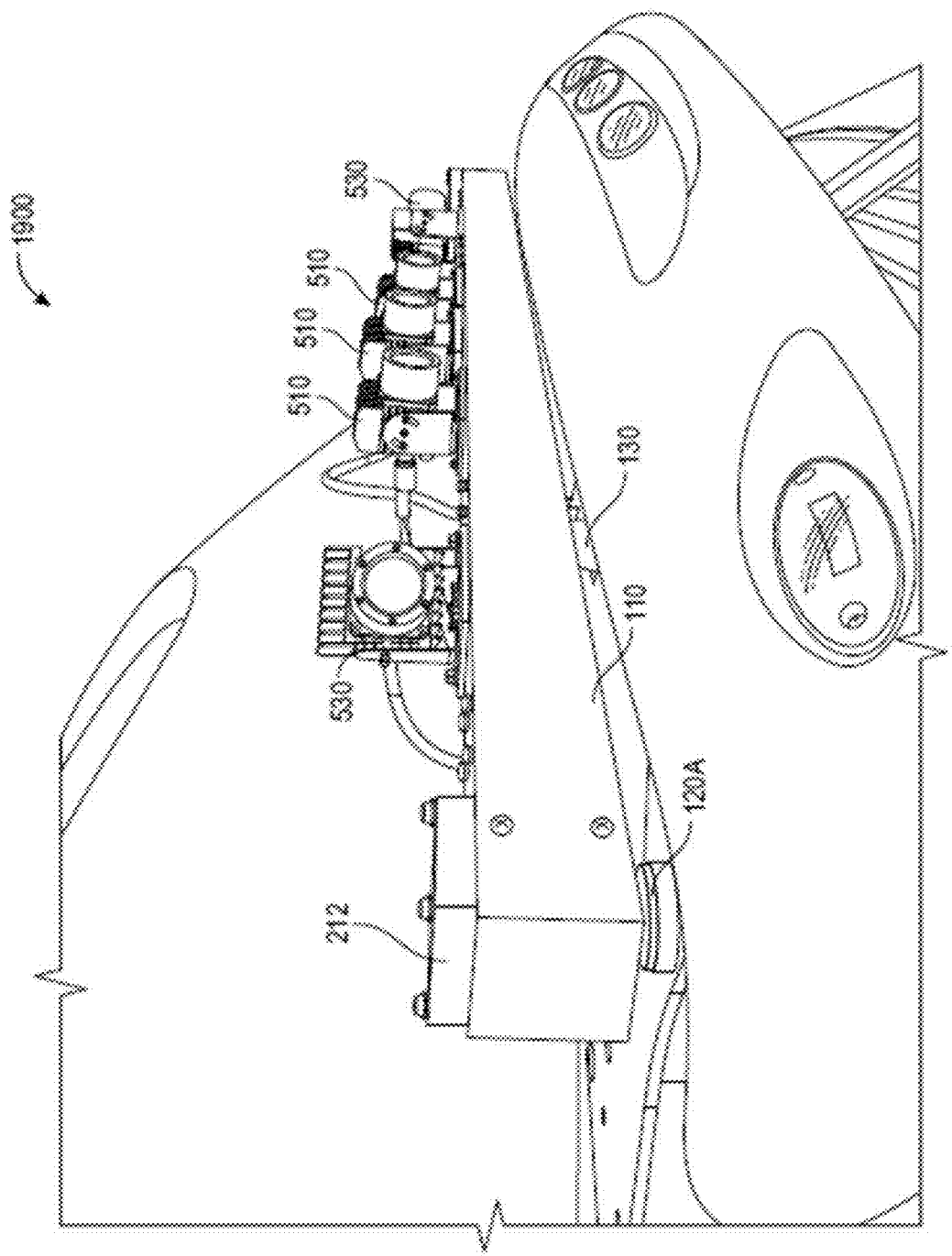
FIG. 19 depicts an example image of a side view of camera mounting structure mounted on a front portion of a roof of a vehicle, in accordance with some example embodiments.

FIG. 19 shows an example image of a side view of camera mounting structure mounted on a front portion of a roof of a vehicle, in accordance with some example embodiments. Shown are end mounts 120A and 120B and center mount 130 attaching camera mounting structure 110 to a truck. Cameras 510 and 530 are mounted to camera mounting structure 110. Beam cap 212 attached to end mount 120A is also shown.

Figure 20:
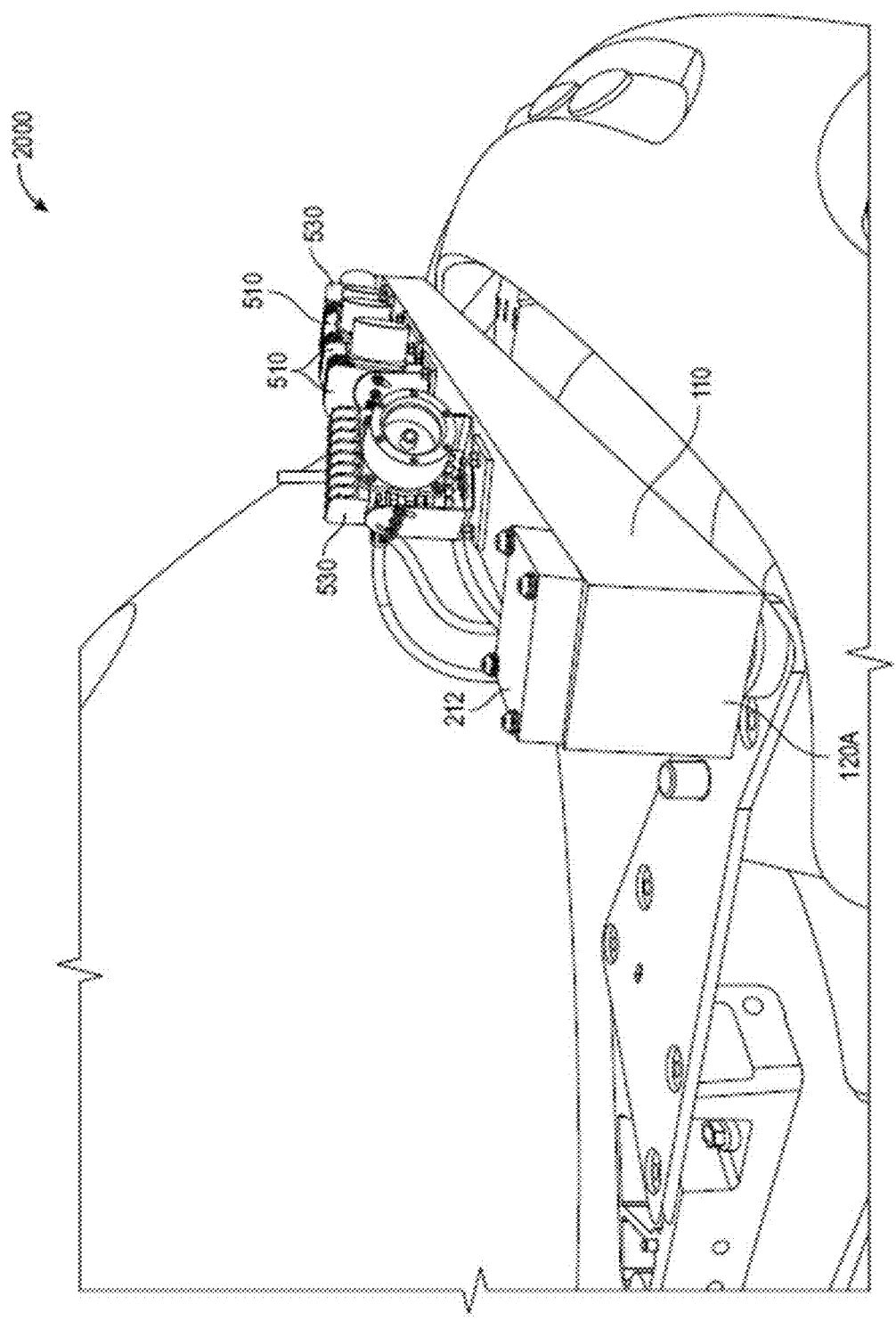
FIG. 20 depicts another example image of a side view of camera mounting structure mounted on a front portion of a roof of a vehicle, in accordance with some example embodiments.

FIG. 20 shows another example image of a side view of camera mounting structure mounted on a front portion of a roof of a vehicle, in accordance with some example embodiments. Shown is end mount 120A attaching camera mounting structure 110 to a truck. Cameras 510 and 530 are mounted to camera mounting structure 110. Beam cap 212 attached to end mount 120A is also shown.

Figure 21:
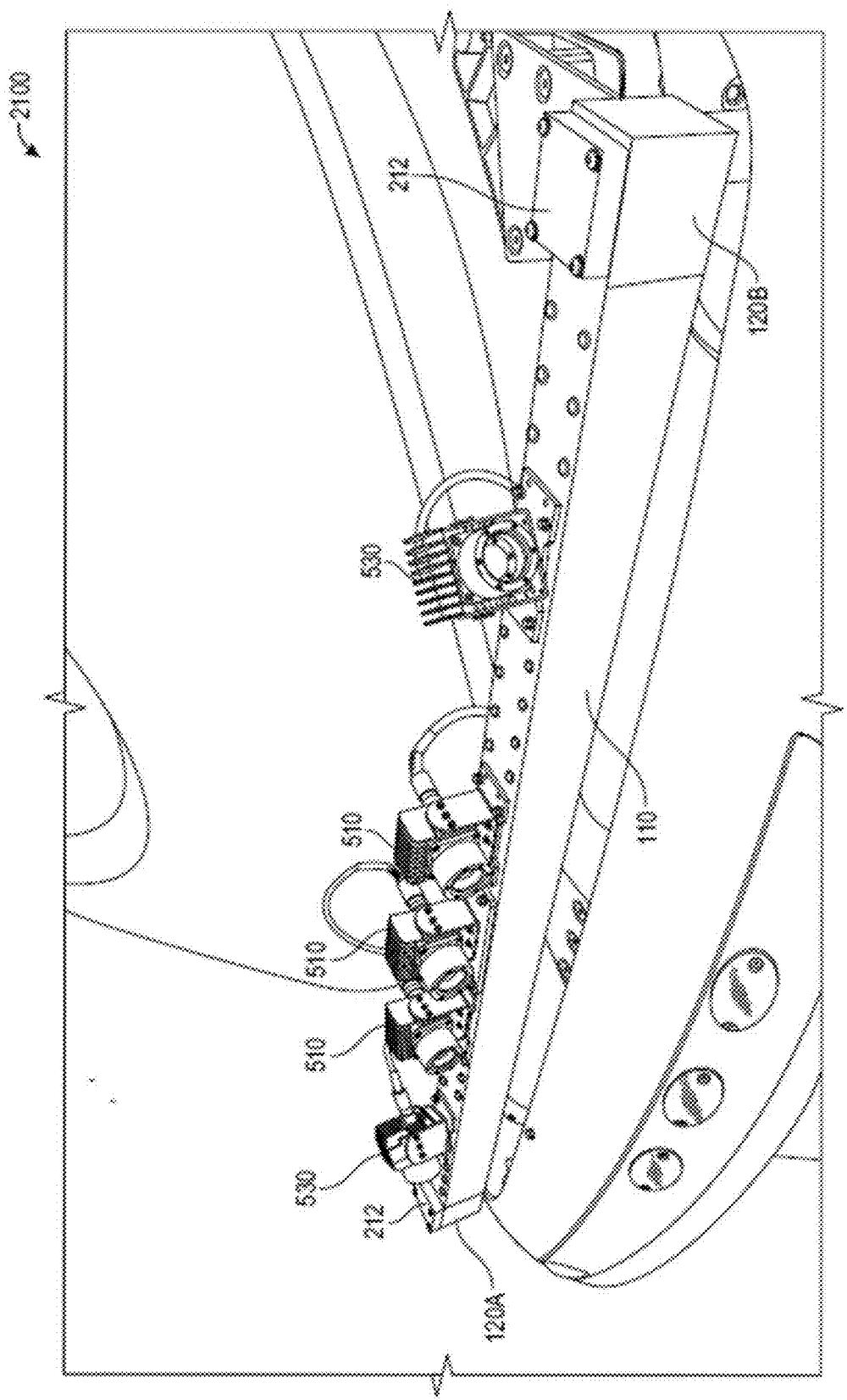
FIG. 21 depicts an example image of a top view of camera mounting structure mounted on a front portion of a roof of a vehicle, in accordance with some example embodiments.

FIG. 21 shows an example image of a top view of camera mounting structure mounted on a front portion of a roof of a vehicle, in accordance with some example embodiments. Shown are end mounts 120A and 120B attaching camera mounting structure 110 to a truck. Cameras 510 and 530 are mounted to camera mounting structure 110. Beam caps 212 attached to end mounts 120A and 120B are also shown.

Figure 22:
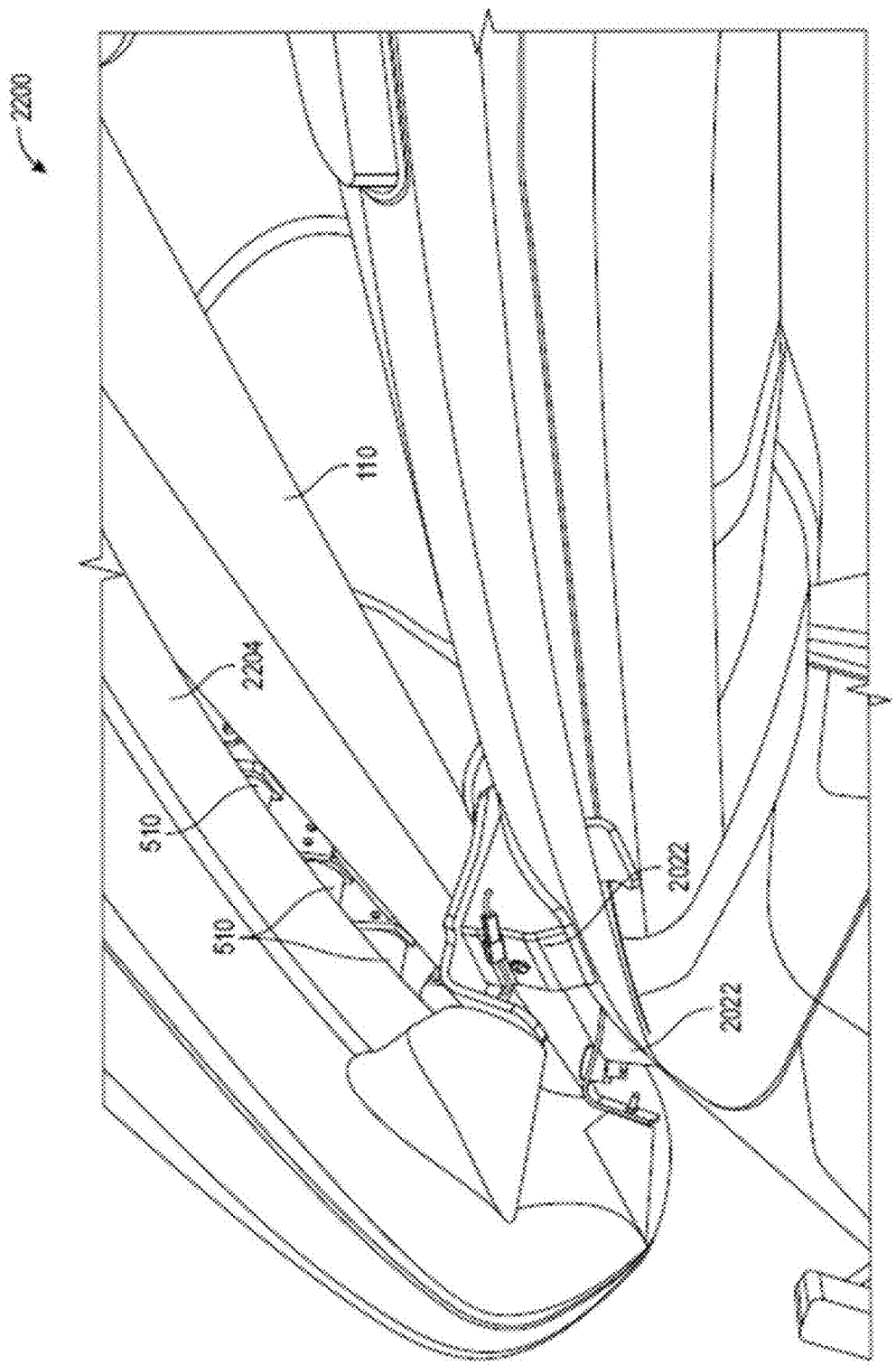
FIG. 22 depicts an example image of a view underneath a camera mounting structure mounted on a front portion of a roof of a vehicle, in accordance with some example embodiments.

FIG. 22 shows an example image of a view underneath a camera mounting structure mounted on a front portion of a roof of a vehicle, in accordance with some example embodiments. Shown are cameras 510. Also shown are a different type of vehicle mount that those shown at 1202. Vehicle mounts 2202 attach the vehicle to camera mounting structure 110 and attach wind deflector 2204 to the vehicle.

Figure 23:
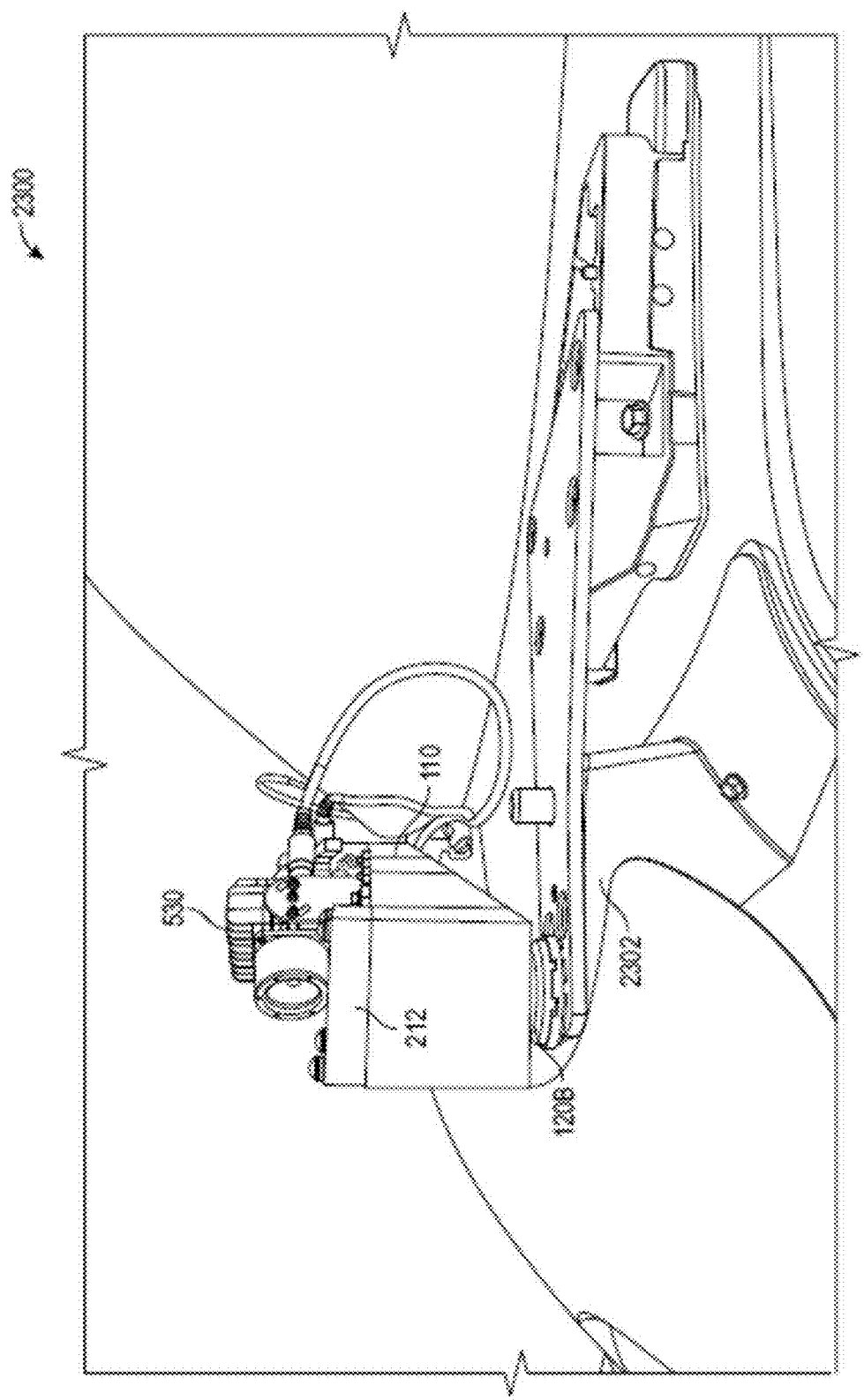
FIG. 23 depicts another example image of a side view of camera mounting structure mounted on a front portion of a roof of a vehicle, in accordance with some example embodiments.

FIG. 23 shows another example image of a side view of camera mounting structure mounted on a front portion of a roof of a vehicle, in accordance with some example embodiments. Shown is end mount 120B attaching camera mounting structure 110 to a truck via vehicle mount 2302. Camera 530 is mounted to camera mounting structure 110. Beam cap 212 attached to end mount 120B is also shown.

Figure 24:
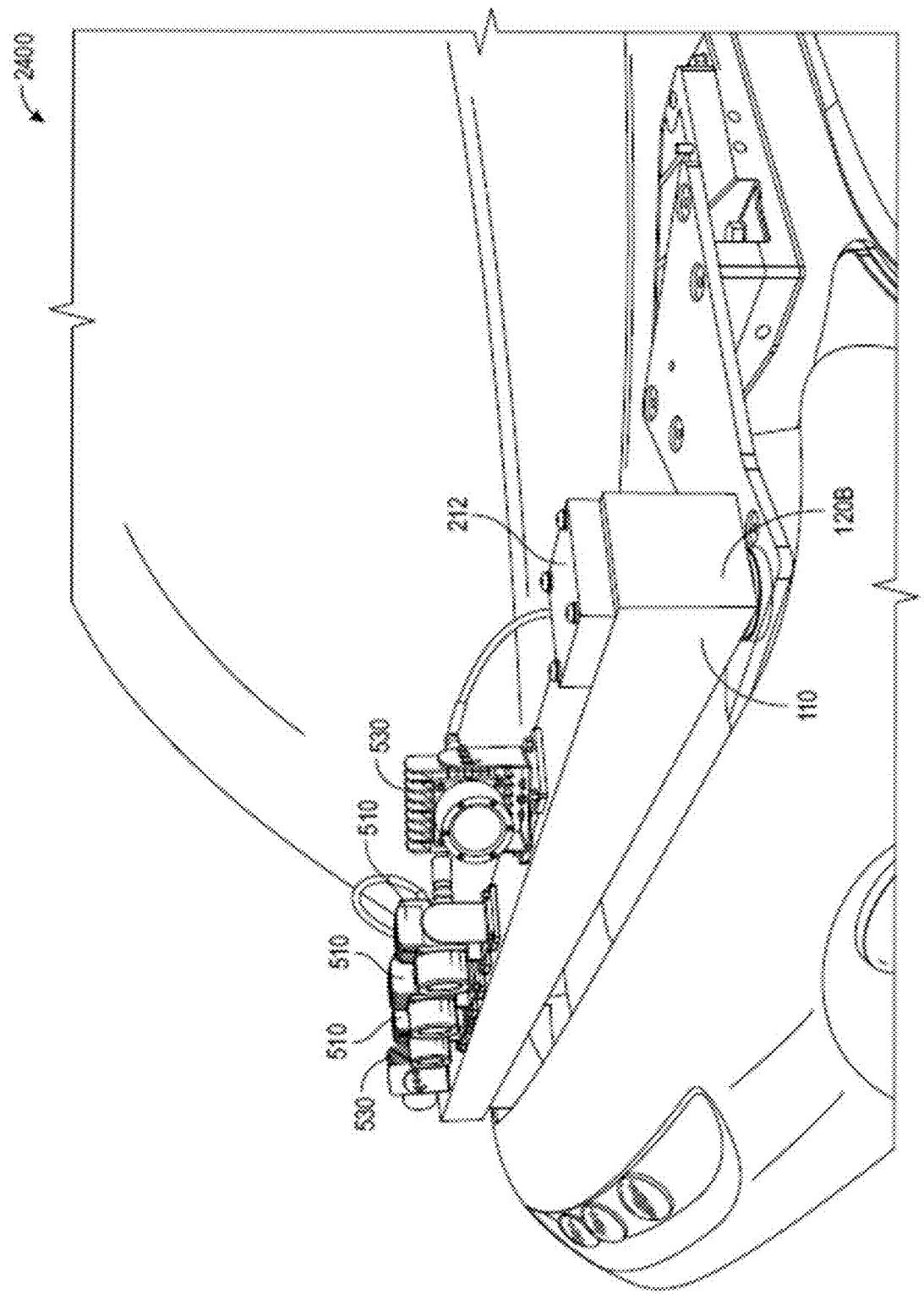
FIG. 24 depicts another example image of a side view of camera mounting structure mounted on a front portion of a roof of a vehicle, in accordance with some example embodiments.

FIG. 24 shows another example image of a side view of camera mounting structure mounted on a front portion of a roof of a vehicle, in accordance with some example embodiments. Shown is end mount 120B attaching camera mounting structure 110 to a truck. Cameras 510 and 530 are mounted to camera mounting structure 110. Beam cap 212 attached to end mount 120B is also shown.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, the separation of various system components in the embodiments described in this patent document should not be understood as requiring such separation in all embodiments. Furthermore, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described, and other implementations, enhancements and variations can be made based on what is described and illustrated in this patent document.

What is claimed is:

1. A method for stabilizing a structure mounted to a vehicle, comprising:
   attenuating, by a center mount and one or more end mounts each including an elastomeric device, vibration at the vehicle from the structure, wherein each elastomeric device is configured to attenuate vibration, and wherein the center mount is configured to prevent a lateral motion of the structure through the center mount;

wherein each elastomeric device included in the one or more end mounts is sandwiched under a bolt between a flat washer and a first surface of a spacer, wherein two adjacent Belleville washers with a third surface are coupled to a second surface of the spacer, wherein a fourth surface of the two adjacent Belleville washers is coupled to a fifth surface of a spherical washer and a sixth surface of the spherical washer is coupled to a spherical bearing.

2. The method of claim 1, wherein the one or more end mounts each includes an attachment device that slides in an obround opening in the structure, and wherein the center mount passes through a round opening and does not slide in in the structure.

3. The method of claim 1, wherein the elastomeric devices are structured to absorb vertical vibration from the vehicle.

4. The method of claim 1, wherein the vehicle is a truck.

5. The method of claim 1, wherein the structure is coupled to a sensor.

6. The method of claim 1, wherein the spherical washer has a concave portion that mates with a convex portion.

7. An apparatus, comprising:
an elongated element;
a center mount coupled via a center coupling to the elongated element at a fixed position along the elongated element, wherein the center coupling comprises an elastomeric material configured to attenuate vibration at a vehicle from the elongated element; and
one or more end mounts coupled via one or more end couplings to the elongated element at one or more second positions along the elongated element, wherein the one or more end couplings comprise the elastomeric material configured to attenuate vibration at the vehicle from the elongated element, and wherein the one or more end couplings accommodate lateral expansion or contraction of the elongated element;
wherein each of the one or more end mounts comprises: a bolt, a flat washer, a spacer, one or more Belleville washers, and a spherical bearing.

8. The apparatus of claim 7, wherein the one or more end mounts each include an attachment device that slides in an obround slot in the elongated element.

9. The apparatus of claim 7, wherein the one or more end mounts are structured to facilitate the elongated element to slide laterally in response to a temperature difference.

10. The apparatus of claim 7, wherein the one or more end mounts are structured to facilitate the elongated element to slide laterally in response to a difference in a coefficient of expansion between the vehicle and the elongated element.

11. The apparatus of claim 7, wherein the center coupling and the one or more end couplings absorb vertical vibration from the vehicle.

12. The apparatus of claim 7, wherein the elongated element is configured to couple to a sensor.

13. The apparatus of claim 7, wherein the spherical washer has a concave portion that mates with a convex portion of the spherical washer.

14. An apparatus for isolating vibration from a device, comprising:
a mounting beam coupled to the device;
one or more vibration isolators coupled to the mounting beam;
a spherical bearing coupled to an attachment device, wherein the spherical bearing is configured to accommodate misalignment of the attachment device; and
a spherical washer structured to adjust a planar surface of the spherical bearing along the attachment device;
wherein each vibration isolator comprises an elastomeric device that is sandwiched under a bolt between a flat washer and a first surface of a spacer, wherein two adjacent Belleville washers with a third surface are coupled to a second surface of the spacer, wherein a fourth surface of the two adjacent Belleville washers is coupled to a fifth surface of a spherical washer and a sixth surface of the spherical washer is coupled to a spherical bearing.

15. The apparatus of claim 14, wherein the one or more vibration isolators are formed from one or more materials including polyurethane, rubber, closed cell foam.

16. The apparatus of claim 14, wherein the mounting beam includes an obround opening within which the one or more vibration isolators, the spherical bearing, and one or more spring washers are configured to slide in response to thermal expansion or contraction of the mounting beam relative to the device.

17. The apparatus of claim 14, wherein one or more sensors are coupled to the mounting beam, each of the one or more sensors having a desired angle and location with respect to the mounting beam such that each of the one or more sensors obtains a desired field of view.

18. The apparatus of claim 14, further comprising:
one or more spring washers to generate a force holding the one or more vibration isolators and spherical bearing in positions, wherein the spherical washer has a concave portion that mates with a convex portion of the spherical washer.

* * * * *